United States Patent
Cai et al.

(10) Patent No.: US 11,138,756 B2
(45) Date of Patent: Oct. 5, 2021

(54) THREE-DIMENSIONAL OBJECT DETECTION METHOD AND DEVICE, METHOD AND DEVICE FOR CONTROLLING SMART DRIVING, MEDIUM AND APPARATUS

(71) Applicants: SENSETIME GROUP LIMITED, Hong Kong (CN); HONDA MOTOR CO. LTD., Tokyo (JP)

(72) Inventors: Yingjie Cai, Hong Kong (CN); Shinan Liu, Hong Kong (CN); Xingyu Zeng, Hong Kong (CN); Junjie Yan, Hong Kong (CN); Xiaogang Wang, Hong Kong (CN); Atsushi Kawamura, Kyoto (JP); Yuji Yasui, Tokyo (JP); Tokitomo Ariyoshi, Tokyo (JP); Yuji Kaneda, Tokyo (JP); Yuhi Goto, Tokyo (JP)

(73) Assignees: SENSETIME GROUP LIMITED, Hong Kong (CN); HONDA MOTOR CO. LTD., Tokyo (JP)

( * ) Notice: Subject to any disclaimer, the term of this patent is extended or adjusted under 35 U.S.C. 154(b) by 0 days.

(21) Appl. No.: 16/837,483

(22) Filed: Apr. 1, 2020

(65) Prior Publication Data
US 2020/0327690 A1    Oct. 15, 2020

(30) Foreign Application Priority Data
Apr. 9, 2019  (CN) .......................... 201910281899.1

(51) Int. Cl.
*G06T 7/73* (2017.01)
*G06T 7/50* (2017.01)

(52) U.S. Cl.
CPC ................. *G06T 7/73* (2017.01); *G06T 7/50* (2017.01); *G06T 2200/08* (2013.01); *G06T 2207/10028* (2013.01); *G06T 2207/30252* (2013.01)

(58) Field of Classification Search
CPC ... G06T 7/73; G06T 7/50; G06T 2207/30252; G06T 2207/10028; G06T 2200/08;
(Continued)

(56) References Cited

U.S. PATENT DOCUMENTS

| 8,717,416 B2 * | 5/2014 | Russell ............... H04N 13/254 348/46 |
| 10,824,880 B2 * | 11/2020 | Yao ......................... G01S 17/86 |

(Continued)

FOREIGN PATENT DOCUMENTS

| JP | 2012527705 A | 11/2012 | |
| JP | 2018195037 A | 12/2018 | |
| KR | 2018036075 | * 4/2018 | ............. G06T 15/00 |

OTHER PUBLICATIONS

Florian Chabot, et al.,Deep Manta: A Coarse-to-fine Many-Task Network for joint 2D and 3D vehicle analysis from monocular image,Proceedings of the IEEE Conference on Computer Vision and Pattern Recognition (CVPR), 2017, United States, 2017, pp. 2040 to 2049. U R L, http://openaccess.thecvf.com/content_cvpr_2017/papers/Chabot_Deep_MANTA_A_CVPR_2017_paper.
(Continued)

*Primary Examiner* — Jerome Grant, II
(74) *Attorney, Agent, or Firm* — Syncoda LLC; Feng Ma

(57) ABSTRACT

A 3D object detection method includes: obtaining two-dimensional (2D) coordinates of at least one predetermined key point of a target object in an image to be processed; constructing a pseudo 3D detection body of the target object in a 2D space according to the 2D coordinates of the at least one predetermined key point; obtaining depth information of
(Continued)

a plurality of vertices of the pseudo 3D detection body; and determining a 3D detection body of the target object in a 3D space according to the depth information of the plurality of vertices of the pseudo 3D detection body.

20 Claims, 16 Drawing Sheets

(58) Field of Classification Search
CPC ............ G06K 9/3233; G06K 9/00369; G06K 9/00201; G06K 9/00805; G06K 9/00208; G06K 9/00825; G06K 9/325; G06K 2209/23; G05D 1/0242; G05D 1/0251; G05D 1/0257; G05D 1/0223; G05D 1/0214; G05D 1/0221; G05D 1/0276; G05D 2201/0212
USPC ........................................................ 382/103
See application file for complete search history.

(56) References Cited

U.S. PATENT DOCUMENTS

| | | | |
|---|---|---|---|
| 2008/0278487 A1* | 11/2008 | Gobert | G06T 7/194 345/420 |
| 2012/0005717 A1* | 1/2012 | Ansari | H04N 13/00 725/153 |
| 2013/0050411 A1* | 2/2013 | Kawahara | H04N 13/261 348/42 |
| 2013/0106837 A1* | 5/2013 | Mukherjee | H04N 13/128 345/419 |
| 2013/0136336 A1* | 5/2013 | Heng | G06K 9/00234 382/154 |
| 2013/0235033 A1* | 9/2013 | Kim | G06K 9/00208 345/419 |
| 2015/0011824 A1* | 1/2015 | Wilkinson | A61B 1/00188 600/109 |
| 2019/0028616 A1* | 1/2019 | Furukawa | G06T 1/00 |
| 2019/0122429 A1* | 4/2019 | Yang | G06K 9/00221 |
| 2019/0279391 A1* | 9/2019 | Narikawa | G06T 7/70 |
| 2020/0090299 A1* | 3/2020 | Uno | G06K 9/00832 |
| 2021/0012571 A1* | 1/2021 | Booth | G06T 7/593 |
| 2021/0027496 A1* | 1/2021 | Koyama | G06T 7/80 |
| 2021/0028033 A1* | 1/2021 | Han | H01L 21/67069 |
| 2021/0097961 A1* | 4/2021 | Ohyama | G09G 5/02 |

OTHER PUBLICATIONS

Zengyi Qin, et al., MonoGRNet: A Geometric Reasoning Network for Monocular 3D Object Localization, arXiv, United States, 2018. URL, https://arxiv.org/pdf/1811.10247v1.

First Office Action of the Japanese application No. 2020-062660, dated May 25, 2021.

* cited by examiner

THREE-DIMENSIONAL OBJECT DETECTION METHOD AND DEVICE, METHOD AND DEVICE FOR CONTROLLING SMART DRIVING, MEDIUM AND APPARATUS

CROSS REFERENCE TO RELATED APPLICATION

This application claims priority to Chinese Application No. 201910281899.1 filed on Apr. 9, 2019, the disclosure of which is hereby incorporated by reference in its entirety.

BACKGROUND 3D detection of an object, also referred to as 3D object detection, is usually used for predicting a 3D spatial parameter of the object, such as its spatial position, its movement direction and its 3D size. For example, in the smart driving technology, the 3D detection of other vehicles on a road needs to be performed to obtain 3D rectangular solids and travel directions of the vehicles, positional relationships between the vehicles and an image capturing (shooting) device, and the like. Obtaining an accurate 3D detection result of the object facilitates improvement of safety in the smart driving.

SUMMARY

The present disclosure relates generally to the field of computer vision technologies, and more specifically to a three-dimensional (3D) object detection method, a 3D object detection device, a method for controlling smart driving, a device for controlling smart driving, an electronic apparatus, a computer readable storage medium and computer programs.

Implementations of the present disclosure provide a technical solution of the 3D object detection and smart driving control.

According to a first aspect of the implementations of the present disclosure, there is provided a 3D object detection method, including: obtaining two-dimensional (2D) coordinates of at least one predetermined key point of a target object in an image to be processed; constructing a pseudo 3D detection body of the target object in a 2D space according to the 2D coordinates of the at least one predetermined key point; obtaining depth information of multiple vertices of the pseudo 3D detection body; and determining a 3D detection body of the target object in a 3D space according to the depth information of the multiple vertices of the pseudo 3D detection body.

According to a second aspect of the implementations of the present disclosure, there is provided a method for controlling smart driving, including: obtaining, by an image capturing device provided on a vehicle, a video stream of a road where the vehicle is on; performing 3D target object detection on at least one frame of image included in the video stream using the 3D object detection method according to the first aspect of the present disclosure, to obtain a 3D detection body of a target object in a 3D space; generating a control instruction for the vehicle according to the 3D detection body; and transmitting the control instruction to the vehicle.

According to a third aspect of the implementations of the present disclosure, there is provided a 3D object detection device, including: a 2D coordinates acquisition module, configured to obtain 2D coordinates of at least one predetermined key point of a target object in an image to be processed; a constructing module, configured to construct a pseudo 3D detection body of the target object in a 2D space according to the 2D coordinates of the at least one predetermined key point; a depth information acquisition module, configured to obtain depth information of a plurality of vertices of the pseudo 3D detection body; and a 3D detection body determination module, configured to determine a 3D detection body of the target object in a 3D space according to the depth information of the plurality of vertices of the pseudo 3D detection body.

According to a fourth aspect of the implementations of the present disclosure, there is provided a device for controlling smart driving, including: a video stream acquisition module, configured to obtain, by an image capturing device provided on a vehicle, a video stream of a road where the vehicle is on; a 3D object detection device, configured to perform 3D target object detection on at least one frame of image included in the video stream, to obtain a 3D detection body of a target object in a 3D space; an instruction generation module, configured to generate a control instruction for the vehicle according to the 3D detection body; and an instruction transmission module, configured to transmit the control instruction to the vehicle.

According to a fifth aspect of the implementations of the present disclosure, there is provided an electronic apparatus, including: a memory storing processor-executable instructions; and a processor arranged to execute the stored processor-executable instructions to perform operations of: obtaining two-dimensional (2D) coordinates of at least one predetermined key point of a target object in an image to be processed; constructing a pseudo 3D detection body of the target object in a 2D space according to the 2D coordinates of the at least one predetermined key point; obtaining depth information of a plurality of vertices of the pseudo 3D detection body; and determining a three-dimensional (3D) detection body of the target object in a 3D space according to the depth information of the plurality of vertices of the pseudo 3D detection body.

According to a sixth aspect of the implementations of the present disclosure, there is provided a computer readable storage medium having stored thereon computer programs that, when executed by a processor, cause the processor to perform the method according to any one of the implementations of the present disclosure.

According to a seventh aspect of the implementations of the present disclosure, there is provided a computer program including computer instructions that, when executed in a processor of a device, cause the processor to implement the implementations in any method of the present disclosure.

The technical solutions of the present disclosure are described in detail below, with reference to the accompanying drawings and embodiments.

BRIEF DESCRIPTION OF THE DRAWINGS

The accompanying drawings constituting a part of the disclosure describe the embodiments of the present disclosure and are intended to explain the principles of the present disclosure together with the descriptions.

According to the following detailed descriptions, the present disclosure can be understood more clearly with reference to the accompanying drawings.

DETAILED DESCRIPTION

Figure 1:
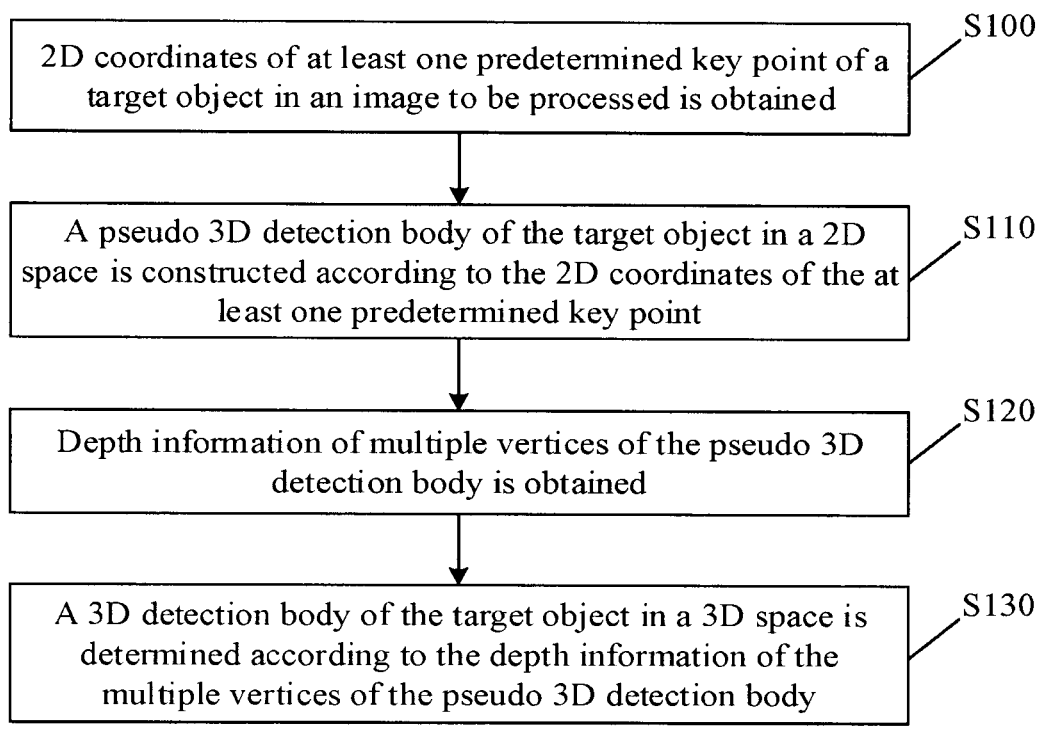
FIG. 1 is a flowchart illustrating an implementation of a 3D object detection method according to the present disclosure.

Various exemplary embodiments of the present disclosure are now described in detail with reference to the accompanying drawings. It should be noted that, unless otherwise stated specifically, relative arrangement of the components and operations, the numerical expressions, and the values set forth in the embodiments are not intended to limit the scope of the present disclosure. In addition, it should be understood that, for ease of description, the size of each part shown in the accompanying drawings is not drawn in actual proportion. The following descriptions of at least one exemplary embodiment are merely illustrative actually, and are not intended to limit the present disclosure and the applications or uses thereof.

Technologies, methods and devices known to a person of ordinary skill in the related art may not be discussed in detail, but such technologies, methods and devices should be considered as a part of the specification in appropriate situations. It should be noted that similar reference numerals and letters in the following accompanying drawings represent similar items. Therefore, once an item is defined in an accompanying drawing, the item does not need to be further discussed in the subsequent accompanying drawings.

The embodiments of the present disclosure may be applied to an electronic apparatus such as a terminal device, a computer system/server, which may operate with numerous other general-purpose or special-purpose computing system environments or configurations. Examples of well-known terminal devices, computing systems, environments, and/or configurations suitable for use together with the electronic apparatus such as the terminal device, the computer system/server include, but are not limited to, vehicle-mounted devices, personal computer systems, server computer systems, thin clients, thick clients, handheld or laptop devices, microprocessor-based systems, set top boxes, programmable consumer electronics, network personal computers, small computer systems, large computer systems, distributed cloud computing environments that include any one of the foregoing systems, and the like.

The electronic apparatus such as the terminal device, the computer system/server may be described in the general context of computer system executable instructions (for example, program modules) executed by the computer system. Generally, the program modules may include routines, programs, target programs, components, logics, data structures, and the like, to perform specific tasks or implement specific abstract data types. The computer system/server may be practiced in the distributed cloud computing environments in which tasks are performed by remote processing devices that are linked through a communications network. In the distributed computing environments, the program modules may be located in local or remote computing system storage media including storage devices.

FIG. 1 is a flowchart illustrating a 3D object detection method according to an embodiment of the disclosure.

As illustrated in FIG. 1, the method according to the embodiment includes operations S100, S110, S120 and S130, which are to be described in detail below.

In operation S100, 2D coordinates of at least one predetermined key point of a target object in an image to be processed is obtained.

In one or more embodiments, the image to be processed in the present disclosure may be a picture, a photo, a video frame and the like. For example, the image to be processed may be a video frame of a video captured by an image capturing device arranged on a movable body, or a video frame of a video captured by an image capturing device arranged at a fixed position. The above movable body may include but is not limited to a vehicle, a robot, a mechanical arm and the like. The above fixed position may include but is not limited to a tabletop, a wall, a roadside and the like.

In one or more embodiments, the image to be processed in the present disclosure may be an image captured by a common high-definition image capturing device such as an infrared ray (IR) camera, a red, green and blue (RGB) camera. High-end hardware such as a radar range device or a depth camera device, which introduces a phenomenon such as a high implementation cost, can be avoided in the present disclosure.

In one or more embodiments, the target object in the present disclosure at least includes four faces: a front face, a rear face, a left face and a right face. For example, the target object in the present disclosure may include but is not limited to: a vehicle, a pedestrian, an animal, a building, a plant, an obstacle, a dangerous article, a traffic sign, an article and the like. The vehicle includes but is not limited to: a two-wheeled motor vehicle (such as a two-wheeled motorcycle, an electric bicycle), a motor vehicle with more than two wheels (such as a three-wheeled motorcycle, a three-wheeled motor vehicle, a four-wheeled motor vehicle), a two-wheeled non-motor vehicle (such as a bicycle) or a non-motor vehicle with more than two wheels (such as a man-powered tricycle) and the like. Since the target object in the present disclosure may be in multiple different forms, the present disclosure is conducive to improving versatility of 3D object detection.

In one or more embodiments, the at least one predetermined key point of the target object in the present disclosure is a key point with a semantic meaning. The at least one predetermined key point of the target object usually include key points on an outer contour of the target object.

Figure 2:
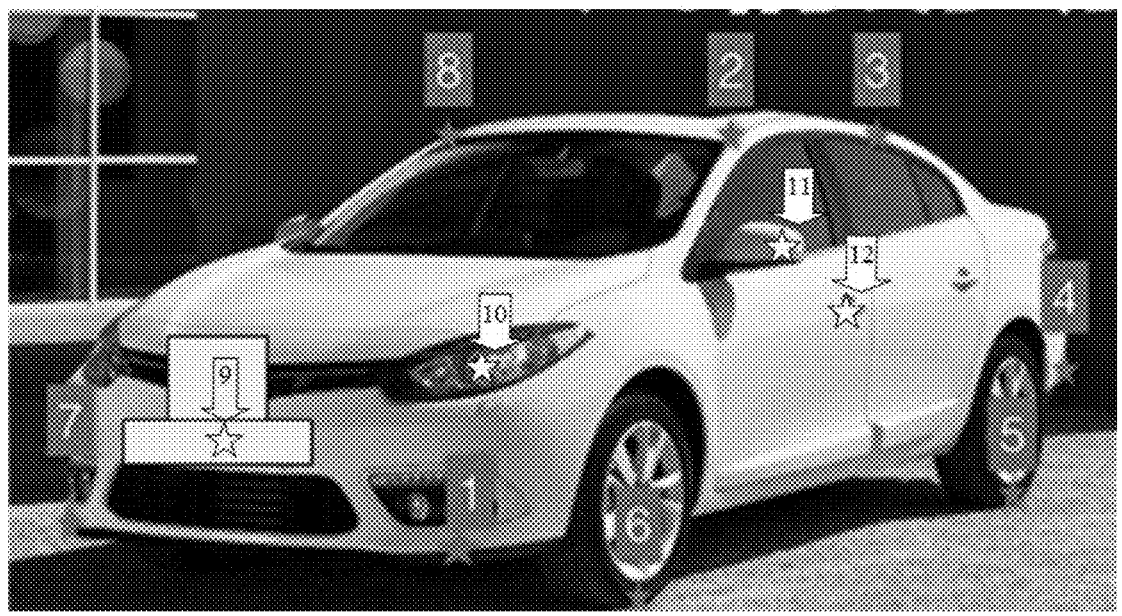
FIG. 2 is a schematic diagram illustrating an implementation of at least one predetermined key point of a target object in an image to be processed according to the present disclosure.

For example, in the case that the target object is a motor vehicle with more than two wheels or a non-motor vehicle with more than two wheels, the at least one predetermined key point of the target object in the present disclosure may include but is not limited to at least one of: a key point in a front left corner of the vehicle (which is designated by 1 in the FIG. 2 and is called "lower front left" for short), a key point in a front left corner on a roof of the vehicle (which is designated by 2 in the FIG. 2 and is called "upper front left" for short), a key point in a rear left corner on the roof of the vehicle (which is designated by 3 in the FIG. 2 and is called "upper rear left" for short), a key point in a rear left corner of the vehicle (which is designated by 4 in the FIG. 2 and is called "lower rear left" for short), a key point at a bottom of a rear left wheel (which is designated by 5 in the FIG. 2 and is called "rear left wheel" for short), a key point at a bottom of a front left wheel (which is designated by 6 in the FIG. 2 and is called "front left wheel" for short), a key point in a front right corner of the vehicle (which is designated by 7 in the FIG. 2 and is called "lower front right" for short), a key point in a front right corner on the roof of the vehicle (which is designated by 8 in the FIG. 2 and is called "upper front right" for short), a key point in a rear right corner on the roof of the vehicle (which has a left-right symmetric relationship with 3 in FIG. 2, and which is not illustrated in FIG. 2 and is called "upper rear right" for short), a key point in a rear right corner of the vehicle (which has a left-right symmetric relationship with 4 in FIG. 2, and which is not illustrated in FIG. 2 and is called "lower rear right" for short), a key point at a bottom of a rear right wheel (which has a left-right symmetric relationship with 5 in FIG. 2, and which is not illustrated in FIG. 2 and is called "rear right wheel" for short),a key point at a bottom of a front right wheel (which has a left-right symmetric relationship with 6 in FIG. 2, and which is not illustrated in FIG. 2 and is called "front right wheel" for short), a key point on a door of the vehicle (which is designated by 12 in FIG. 2), a key point on a rear-view mirror (which is designated by 11 in FIG. 2), a key point on a number plate of the vehicle (which is designated by 9 in FIG. 2), or a key point of a light of the vehicle (which is designated by 10 in FIG. 2). The key point on the door of the vehicle may include at least one of: a key point on a front left door of the vehicle, a key point on a rear left door of the vehicle, a key point on a front right door of the vehicle, or a key point on a rear right door of the vehicle. The key point on the number plate of the vehicle may include at least one of: a key point on a front number plate of the vehicle or a key point on a rear number plate of the vehicle. The key point of the light of the vehicle may include at least one of: a key point of a front left light of the vehicle, a key point of a front right light of the vehicle, a key point of a rear left light of the vehicle or a key point of a rear right light of the vehicle. It can be known from the above description that the semantic meaning of the at least one predetermined key point in the present disclosure may represent a specific location of the at least one predetermined key point in the vehicle.

Figure 3:
FIG. 3 is a schematic diagram illustrating another implementation of at least one predetermined key point of a target object in an image to be processed according to the present disclosure.

For another example, in the case that the target object is a two-wheeled motor vehicle (note: not including its rider) or a two-wheeled non-motor vehicle (note: not including its rider), the at least one predetermined key point in the present disclosure may include but is not limited to one or more of: a key point in a center of a front wheel (designated by a in FIG. 3), a key point in a center of a rear wheel (designated by b in FIG. 3), a grounded key point of the front wheel (designated by c in FIG. 3), a grounded key point of the rear wheel (designated by d in FIG. 3), a key point on a support of a vehicle seat (designated by e in FIG. 3), a key point on a pedal bearing (designated by f in FIG. 3),a key point in a center of a vehicle handlebar (designated by g in FIG. 3), a key point on a left end of the vehicle handlebar (designated by h in FIG. 3), a key point on a right end of the vehicle handlebar (designated by i in FIG. 3), a key point on a front end of the front wheel (designated by p in FIG. 3), a key point on a rear end of the rear wheel (designated by q in FIG. 3).

Figure 4:
FIG. 4 is a schematic diagram illustrating another implementation of at least one predetermined key point of a target object in an image to be processed according to the present disclosure.

For another example, in the case that the target object is a two-wheeled motor vehicle with its rider or a two-wheeled non-motor vehicle with its rider, the at least one predetermined key point in the present disclosure may include but is not limited to one or more of: a key point in a center of a front wheel (designated by a in FIG. 4), a key point in a center of a rear wheel (designated by b in FIG. 4), a grounded key point of the front wheel (designated by c in FIG. 4), a grounded key point of the rear wheel (designated by d in FIG. 4), a key point on a support of a vehicle seat (designated by e in FIG. 4), a key point on a pedal bearing (designated by f in FIG. 4), a key point in a center of a vehicle handlebar (designated by g in FIG. 4), a key point on a left end of the vehicle handlebar (designated by h in FIG. 4), a key point on a right end of the vehicle handlebar (designated by i in FIG. 4), a key point on a left shoulder of the rider (designated by j in FIG. 4), a key point on a right shoulder of the rider (designated by k in FIG. 4) or a key point on top of the rider's head (designated by m in FIG. 4). According to some embodiments, the at least one predetermined key point may also include: a key point on a front end of the front wheel, a key point on a rear end of the rear wheel.

In one or more embodiments, the at least one predetermined key point may be either all key points of the target object obtained by performing key point detection on the image to be processed or key points screened out from multiple key points of the target object, which are obtained through the detection. For example, in the present disclosure, all the key points of the target object in the image to be processed are obtained by means of the key point detection, then one or more key points with a credibility greater than a preset credibility threshold are determined as the at least one predetermined key point of the target object among all the key points. In the present disclosure, by the determination of key points with a high predicted credibility as the at least one predetermined key point. it is conducive to improving accuracy in constructing a pseudo 3D rectangular solid.

According to some embodiments, in the present disclosure, after the at least one predetermined key point of the target object is obtained, other operations in the 3D object detection method according to the present disclosure usually continue to be performed; otherwise, these operations are not to be performed, thus it is conducive to saving computing resources. In the present disclosure, a switch can be made from the 3D object detection method according to the present disclosure to an existing object detection method when the at least one predetermined key points of the target object is not obtained successfully. For example, the switch is made to a 2D target detection method of the target object to perform an operation of obtaining 2D target detection of the target object. In addition, in the present disclosure, when the key points of the target object are not obtained, a switch may be made from the 3D object detection method according to the present disclosure to an existing 3D object detection method. For example, 3D detection of the target object is implemented according to point cloud data obtained based on a radar range device.

In one or more embodiments of the present disclosure, the key points of the target object in the image to be processed may be obtained using a neural network (such as a convolutional neural network based on deep learning).

For example, the image to be processed that includes the target object is inputted into the neural network, then the neural network performs key point detection processing on the image to be processed, it is thus possible to obtain each key point of the target object according to information outputted by the neural network, such as obtaining the key point's number and 2D coordinates of the key point in the image to be processed.

For another example, firstly, target object detection processing is performed on the image to be processed, to obtain a 2D target detection frame including at least part of the target object, and then segmentation processing is performed on the image to be processed according to the 2D target detection frame to obtain an image block of the target object (i.e., an image block including at least part of the target object such as an image block including at least part of the four-wheeled motor vehicle); and the image block of the target object is inputted into the neural network, and then the neural network performs key point detection processing on the image block of the target object, it is thus possible to obtain each key point of the target object according to information outputted by the neural network, such as obtaining the key point's number and 2D coordinates of the key point in the image block of the target object. Furthermore, the 2D coordinates of the each key point of the target object in the image block of the target object can be converted to the 2D coordinates of the each key point of the target object in the image to be processed.

The above 2D target detection frame may be: a 2D target detection frame for a two-wheeled motor vehicle, a 2D target detection frame for a two-wheeled non-motor vehicle, a 2D target detection frame for a two-wheeled motor vehicle and its rider, or a 2D target detection frame for a two-wheeled non-motor vehicle and its rider. In some application scenarios, when the target object includes a two-wheeled motor vehicle and its rider, both a 2D target detection frame including the at least part of the two-wheeled motor vehicle and a 2D target detection frame including at least part of the two-wheeled motor vehicle and its rider can be obtained by performing the target object detection on the image to be processed in the present disclosure. In some other application scenarios, when the target object includes a two-wheeled non-motor vehicle and its rider, both a 2D target detection frame including at least part of the two-wheeled non-motor vehicle and a 2D target detection frame including at least part of the two-wheeled non-motor vehicle and its rider can be obtained by performing the target object detection on the image to be processed in the present disclosure.

In one or more embodiments, the neural network used for obtaining the at least one predetermined key point of the target object may include but is not limited to: a convolutional layer, a rectified linear unit (ReLu) layer, a pooling layer, a fully connected layer and the like. The neural network becomes deeper as a number of the layers included by the neural network increases. In the present disclosure, the neural network of the present disclosure may adopt a stack hourglass neural network frame structure, or may also adopt a neural network frame structure based on an active shape model (ASM), a neural network frame structure based on an active appearance model (AAM) or a neural network frame structure based on a cascaded shape regression algorithm, but the disclosure is not limited thereto.

In operation S110, a pseudo 3D detection body of the target object in a 2D space is constructed according to the 2D coordinates of the at least one predetermined key point.

In one or more embodiments, the pseudo 3D detection body in the present disclosure is actually a polyhedron constructed based on a 2D polygon. Possible factors due to which the 2D polygon can be perceived by human vision as the polyhedron may include: a depth can be "complemented by a human brain" through a binocular parallax of human eyes, or the human eyes can perform a 3D construction of the 2D polygon according to a specific strategy. However, since such a 2D polygon actually only has 2D coordinates but does not have actual depth information, it is called "a pseudo 3D detection body" in the present disclosure. A spatial polyhedron with the depth information is accordingly called "a 3D detection body." Although the pseudo 3D detection body is not a real 3D shape in a 3D space, it also includes a left side face, a right side face, a front face, a rear face, a top face and a bottom face, and the six faces form an accommodating space that at least includes a part or all of the target object. Moreover, a length, a width and a height of the pseudo 3D detection body can reflect a length, a width and a height of the target object to some extent. The 3D space in the present disclosure is usually a 3D space in the real world, such as a 3D space based on a 3D coordinate system of an image capturing device.

According to some embodiments, the pseudo 3D detection body of the target object in the present disclosure is usually a polyhedron that can at least include a part or all of the target object on a 2D plane, such as a rectangular solid that includes a part or all of the target object on a 2D plane. The rectangular solid is constructed by drawing on the 2D plane. It is a rectangular solid on the 2D plane rather than a rectangular solid constructed using depth information of a real 3D space and can be called "a pseudo 3D rectangular solid" in the present disclosure. An outer contour formed by a combination of edges of the pseudo 3D rectangular solid on the 2D plane is usually in an irregular shape. A length, a width and a height of the pseudo 3D rectangular solid in the present disclosure can be regarded as a length, a width and a height of a target object included by the pseudo 3D rectangular solid. In some application scenarios, the pseudo 3D rectangular solid can be regarded as a circumscribed rectangular solid of the target object on the 2D plane. The pseudo 3D polyhedron in the present disclosure includes a pseudo 3D cube. According to some embodiments, the pseudo 3D detection body may also be a polyhedron in other shape which at least includes a part of the target object on the 2D plane, such as a parallel hexahedron.

It should be particularly noted that in some application scenarios, the pseudo 3D detection body in the present disclosure may be a pseudo 3D detection body with a thickness (i.e., a width) simplistically set as a preset value.

The preset value in the present disclosure may be a relatively small value approximately equal to zero. With respect to a two-wheeled motor vehicle, a two-wheeled non-motor vehicle, a motor vehicle with more than two wheels and a non-motor vehicle with more than two wheels, the length of the target object corresponds to a lengthwise direction of the vehicle body, the width of the target object corresponds to a width direction of the vehicle body, and the height of the target object corresponds to a height direction of the vehicle body. In one or more embodiments, with respect to a target object with a relatively small thickness such as a two-wheeled motor vehicle (such as a bicycle or a two-wheeled motorcycle), a pedestrian or a traffic sign, the pseudo 3D detection body in the present disclosure may be a pseudo 3D detection body with a thickness simplistically set as a relatively small value approximately equal to zero. However, with respect to a target object such as a motor vehicle with more than two wheels or a non-motor vehicle with more than two wheels, the thickness of the pseudo 3D detection body is usually not a preset value that is set in advance. The relatively small thickness of the target object is usually considered as a relatively small thickness compared with other size of the target object. For example, a thickness of the bicycle (such as a distance between outmost points of two handlebars of the bicycle) is usually relatively small compared to a length of the bicycle (such as a distance between outmost points on a front wheel and a rear wheel) and a height of the bicycle (such as a distance between a highest point of the handlebar and the ground).

In one or more embodiments, screening processing can be performed on all the key points of the target object obtained by the neural network. For example, key points with a credibility greater than the preset credibility threshold are screened out and determined as the at least one predetermined key point that meets a requirement for a predicted accuracy, and then the pseudo 3D detection body of the target object is constructed on the 2D plane using the 2D coordinates of at least one screened-out predetermined key point.

In one or more embodiments of the present disclosure, firstly, a lengthwise section of the target object can be determined according to the 2D coordinates of the at least one predetermined key point; and then the thickness of the target object is determined. For example, the preset thickness (i.e., a known value) is determined as the thickness of the target object. For another example, the thickness of the target object is determined according to 2D coordinates of the at least one predetermined key point (such as the key points on two ends of the vehicle handlebar or two key points on shoulders of the rider) not included in the section (for example, the calculated distance between the ends of the two handlebars of the bicycle or the calculated distance between the two shoulders is determined as the thickness of the target object), and then the pseudo 3D detection body of the target object is constructed according to the above section and above the thickness.

In one or more embodiments of the present disclosure, firstly, at least one structural plane of the target object is determined according to predetermined belonging relationships between the at least one predetermined key point and planes included by the target object, and then the pseudo 3D detection body of the target object is constructed according to the structural plane and the 2D coordinates of the at least one predetermined key point. In some embodiments, the predetermined belonging relationship refers to whether a predetermined key point is a point of a plane included by the target object, or whether the predetermined key point belongs to the plane included by the target object.

Figure 7:
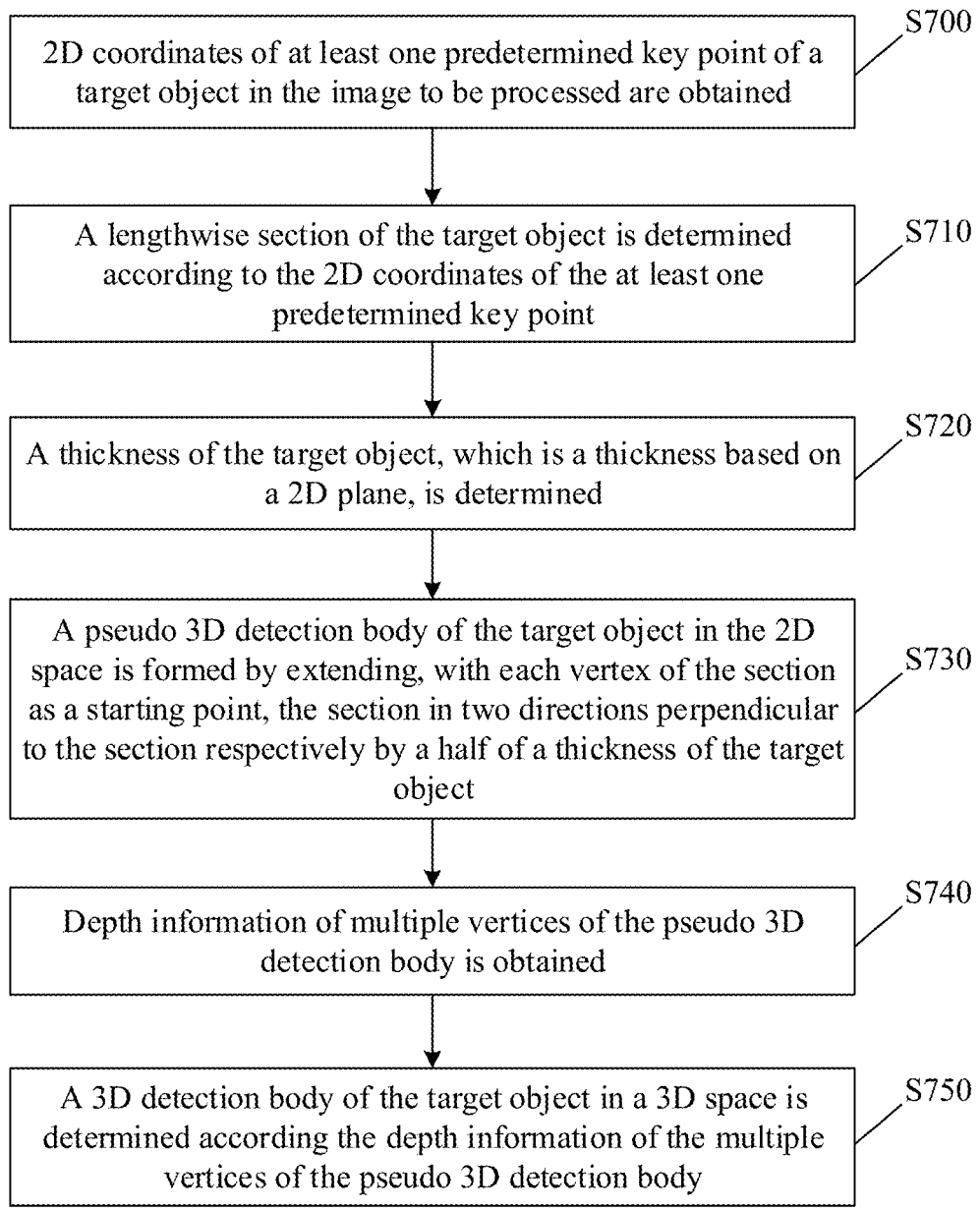
FIG. 7 is a flowchart illustrating another implementation of a 3D object detection method according to the present disclosure.
Figure 10:
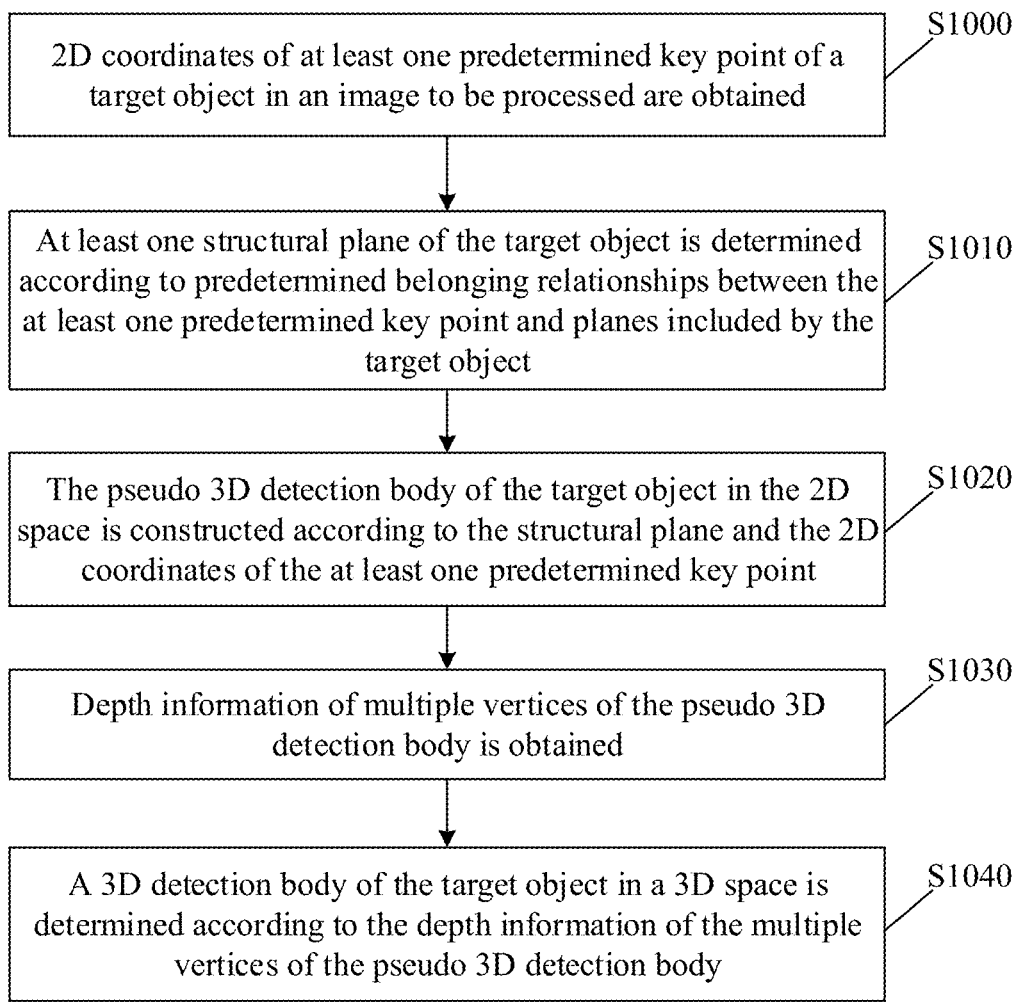
FIG. 10 is a flowchart illustrating another implementation of a 3D object detection method according to the present disclosure.

The descriptions made with respect to FIG. 7 and FIG. 10 can be referred to for a detailed implementation process of the above two examples, which will not be elaborated herein.

In operation S120, depth information of multiple vertices of the pseudo 3D detection body is obtained.

In one or more embodiments, the depth information of any vertex of the pseudo 3D detection body in the present disclosure can be considered as depth information of a corresponding vertical edge of the pseudo 3D detection body, can also be considered as depth information of two end points of the corresponding vertical edge of the pseudo 3D detection body, or can further be considered as depth information of corresponding other edge other than the vertical edge of the pseudo 3D detection body. The vertical edge in the present disclosure usually refers to an edge of the pseudo 3D detection body which corresponds to a height direction of the target object and is perpendicular to a plane (such as the ground or a platform) supporting the target object. All points (including vertices of the vertical edge) on one vertical edge of the pseudo 3D detection body usually have same depth information. In the present disclosure, the other edge other than the vertical edge usually refers to an edge of the pseudo 3D detection body which corresponds to a lengthwise direction or a width direction of the target object and which is parallel to the plane supporting the target object. The above other edge can also be regarded as an edge that is on or parallel to an XOZ plane of the image capturing device, which is called an edge in the horizontal direction or a horizontal edge in the description below for the sake of convenience.

In one or more embodiments, a manner of obtaining the depth information of the two end points of the vertical edge of the pseudo 3D detection body in the present disclosure may include two operations below.

In operation 1, for any vertical edge of the pseudo 3D detection body, a distance represented by a unit pixel at a position of a point on a ray corresponding to the vertical edge in a bird's eye view is obtained according to 2D coordinates of the two end points of the vertical edge of the pseudo 3D detection body in the image to be processed and a preset height value of the target object.

The preset height value of the target object in the present disclosure is usually a height value of the target object in the real world. The preset height value of the target object is a known value. For example, a height value of at least one model of a four-wheeled motor vehicle is preset so that in the present disclosure, the preset height value of the four-wheeled motor vehicle in the image to be processed can be found out according to preset correspondences between types or models and the height values by recognizing a type or a model of the four-wheeled motor vehicle in the image to be processed. The above types include but are not limited to: car, SUV, big truck, bus and the like. The above models include but are not limited to: a brand of the four-wheeled motor vehicle or a series of the brand and the like. In addition, a possibility of obtaining the height value of the target object in a manner such as real-time height detection is not excluded in the present disclosure. For example, the height value of the target object may be predicted using a regression neural network.

Figure 5:
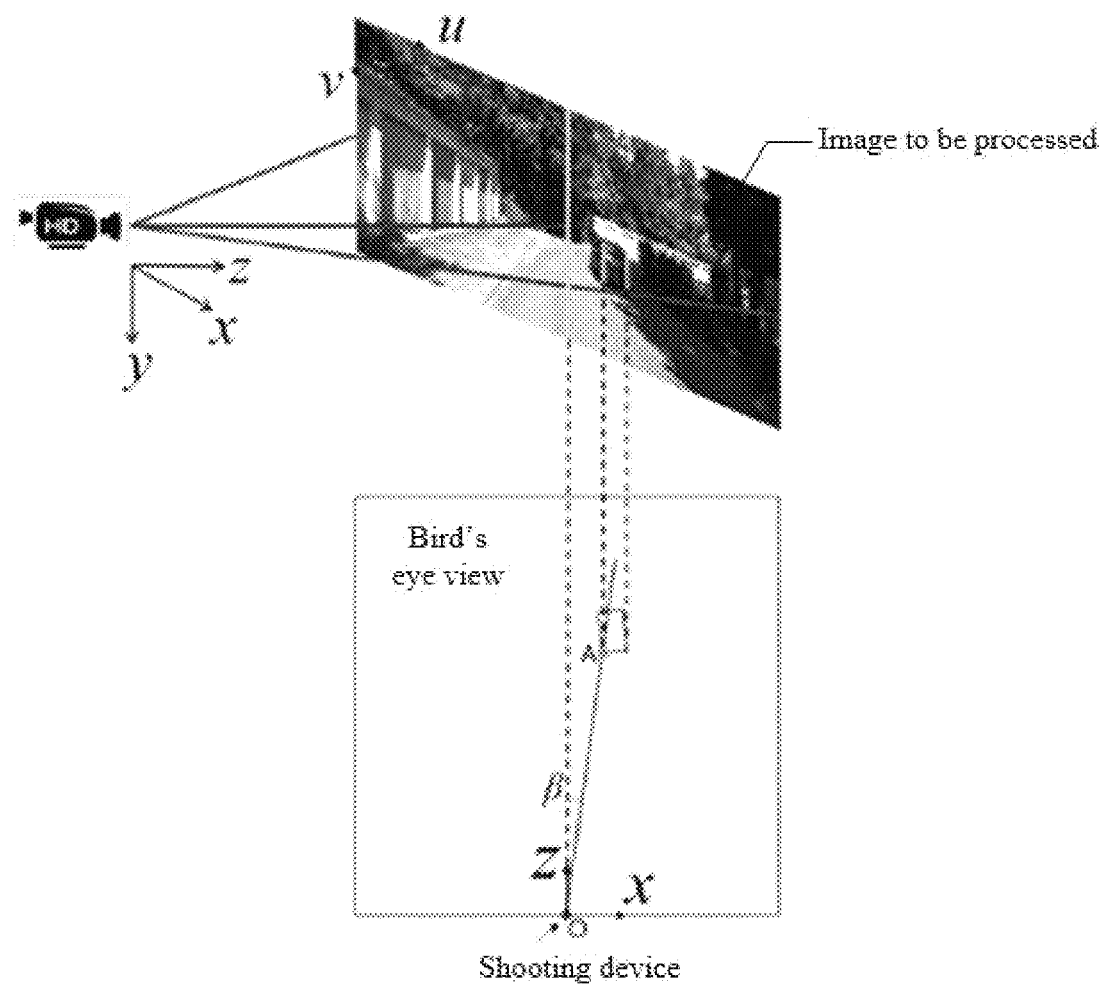
FIG. 5 is a schematic diagram illustrating one implementation in the case that a projection is a bird's eye view according to the present disclosure.

The bird's eye view in the present disclosure usually refers to a projection map that is obtained from a downward perspective along a y-axis of a 3D coordinate system of the image capturing device, and that includes a position of the image capturing device. An upper right image in FIG. 5 is the image to be processed which includes an image block of one four-wheeled motor vehicle. Two vertical edges of one pseudo 3D detection body for the motor vehicle are designated by two light gray vertical lines on the right side in the image to be processed. The left one of the two vertical lines is projected as a point A in the bird's eye view and the image capturing device is projected as a point o in the bird's eye view. In addition, a ray oA is a ray in a bird's eye view corresponding to a vertical edge of the pseudo 3D detection body. If one vertical edge of the pseudo 3D detection body is called a pillar, the pseudo 3D detection body formed in the present disclosure usually includes four pillars.

Although the pillars which are at different positions and have equal height in the image to be processed may be projected on a same ray in the bird's eye view, they are projected as points at different positions on the ray. Furthermore, a point on a ray of the bird's eye view can move along the ray. When the point reaches different positions of the ray, pillars with a same height in the image to be processed, which are representative by the different points, correspond to different numbers of pixels. It can be known that when the pillars with the same height are projected as the points at different positions of one ray in the bird's eye view, each of the points at the different positions of the ray uniquely corresponds to a number of pixels, and the points at different positions correspond to different numbers of pixels.

In the present disclosure, based on the above, a height of the vertical edge in the image to be processed can be calculated according to the 2D coordinates of the two end points of the vertical edge of the pseudo 3D detection body in the image to be processed. For example, if 2D coordinates of two end points of one vertical edge of the pseudo 3D detection body are (ul, vt) and (ul, vb) respectively, a height of the vertical edge in the image to be processed is abs(vt−vb), wherein abs(*) represents an absolute value of *.

Since the height value of the target object is preset, the height of the target object (marked by height) is known. For example, it can be 1.5 meters. The height value of the target object is usually a coordinate value of the target object in a vertical direction (such as the Y-axis) of the 2D coordinate system. In the present disclosure, the distance represented by the unit pixel at the position of the point on the ray corresponding to the vertical edge in the bird's eye view, which is a real scale (marked by scale), can be calculated using height/abs(vt−vb). In other words, scale can be calculated using a formula (1) below:

$$\text{scale} = \text{height}/\text{abs}(vt-vb). \quad (1)$$

In the above formula (1), height represents the preset height value of the target object; abs(*) represents the absolute value of *; vt represents a coordinate value in the vertical direction (such as the Y-axis) of 2D coordinates of one end point of the vertical edge; and vb represents a coordinate value in the vertical direction of 2D coordinates of another end point of the vertical edge.

In operation 2, the depth information of the vertical edge is determined according to the above obtained distance and a parameter of the image capturing device.

In one or more embodiments, the parameter of the image capturing device in the present disclosure usually includes a focal length of the image capturing device (marked by fx) and a shift amount (marked by cx) of an optical center. The parameter of the image capturing device is usually a known value. Since a unit pixel in any direction of one plane that is at a certain distance away from the image capturing device represents a same real scale, the coordinate of the vertical edge in a horizontal direction (such as an X-axis) of the 3D coordinate system can be obtained using scale·(ul−cx) in the present disclosure. Herein cx is the shift amount of the optical center. β in FIG. 5 satisfies $$\tan\beta = \frac{x}{z}.$$

Moreover, in the present disclosure, the depth information (marked by z) of the end point on the vertical edge can be calculated using a formula (2) below:

$$(ul-cx)/fx=x/z. \quad (2)$$

In the above formula (2), ul represents a coordinate value in the horizontal direction (such as the X-axis) of 2D coordinates of one end point of the vertical edge; z represents a coordinate value of one end point of the vertical edge in a depth direction (such as a Z-axis) of the 3D coordinate system; fx represents the focal length of the image capturing device and cx represents the shift amount of the optical center.

The above manner of obtaining the depth information of the vertical edge or the depth information of the end point of the vertical edge is called a manner of obtaining the depth information based on a pillar strategy. In the present disclosure, the depth information of the vertical edge is obtained using a projection principle of the image capturing device. In this way, it is possible to avoid necessary use of high-cost hardware device such as a radar range device and a depth-based image capturing device to obtain the depth information. Thus, it is conducive to acquisition of the depth information of the 3D detection body in a low-cost and fast way in the case that consumption of the computing resources is low, thereby facilitating broadening an application scope of the 3D object detection in the present disclosure.

In one or more embodiments, firstly, a depth diagram of the image to be processed is obtained using a manner such as a monocular manner, a binocular manner; and then a depth value of at least one vertex of the pseudo 3D detection body is read from the depth diagram using 2D coordinates of the at least one vertex so that the depth information of a corresponding vertical edge of the pseudo 3D detection body can be obtained. In addition, the depth information of the multiple vertices of the pseudo 3D detection body can be directly obtained using a matrix H, that is to say, the depth values of the multiple vertices of the pseudo 3D detection body (a unit of the depth values may be "meter") are obtained from a product of the 2D coordinates of the multiple vertex and the matrix H. Furthermore, when the image capturing device is a depth-based image capturing device, the depth values of the key points of the target object can be directly obtained so that the depth value of corresponding vertical edge of the pseudo 3D detection body is obtained. A specific implementation process of obtaining the depth information of the vertical edge of the pseudo 3D detection body is not limited in the present disclosure.

It is to be noted especially that in the present disclosure, the depth information of the end points on the vertical edge of the pseudo 3D detection body is obtained by performing operations 1 and 2, so that the depth information of the corresponding vertices of the pseudo 3D detection body is believed to have been obtained. In the present disclosure, the depth information of two end points of a horizontal edge of the pseudo 3D detection body is obtained, so that the depth information of the corresponding vertices of the pseudo 3D detection body can also be believed to have been obtained.

For example, in the present disclosure, the height value of the target object can be replaced by the width value (the thickness) of the target object. Likewise, the width value is usually a preset known value, for example, the width value can be equal to 1.6 meters. Furthermore, the corresponding bird's eye view can be replaced by a left view or a right view, and a projection edge of a horizontal edge of the pseudo 3D detection body in the left view or right view is obtained by multiplying the horizontal edge by cos(θ). θ represents an angle between the horizontal edge and a Z-axis of the image capturing device. In the present disclosure, a distance (marked by scale) represented by a unit pixel on the projection edge is then calculated according to a formula (3) below:

scale=width*cos(θ)/abs(*ul-ur*). (3)

In the formula (3), ul represents a coordinate value in the horizontal direction (such as a coordinate value on the X-axis) of 2D coordinates of a left end point of the horizontal edge, ur represents a coordinate value in the horizontal direction (such as a coordinate value on the X-axis) of 2D coordinates of a right end point of the horizontal edge, and θ represents an angle between the horizontal edge of the pseudo 3D detection body and the Z-axis of the image capturing device, which satisfies the equation:

$$\tan\theta = \frac{x}{z}.$$

Then, in the present disclosure, depth information (marked by z1 and z2 respectively) of the two end points of the horizontal edge is calculated using a formula (4) below according to the distance scale and the parameter of the image capturing device.

$x1$=scale$x$(*ul-cx*)

$x2$=scale$x$(*ur-cx*)

(*ul-cx*)/*fx*=$x1$/$z1$ (*ur-cx*)/*fx*=$x2$/$z2$. (4)

In formulae (4), ul represents a coordinate value in the horizontal direction (such as a coordinate value on the X-axis) of 2D coordinates of a left end point of the horizontal edge; ur represents a coordinate value in the horizontal direction (such as a coordinate value on the X-axis) of 2D coordinates of a right end point of the horizontal edge, the coordinate value z represents a coordinate value of one end point of the vertical edge in the depth direction (such as the Z-axis) of the 3D coordinate system; fx represents the focal length of the image capturing device; cx represents the shift amount of the optical center; z1 represents the depth information of the left end point of the horizontal edge; and z2 represents the depth information of the right end point of the horizontal edge.

In operation S130, a 3D detection body of the target object in a 3D space is determined according to the depth information of the multiple vertices of the pseudo 3D detection body.

Based on the 3D object detection method, the 3D object detection device, the method for controlling smart driving, the device for controlling smart driving, the electronic apparatus, the computer readable storage medium and the computer programs provided according to implementations of the present disclosure, the pseudo 3D detection body is constructed using the 2D coordinates of at least one predetermined key point of the target object in the image to be processed, and the 3D detection body of the target object is formed using the depth information of the multiple vertices of the pseudo 3D detection body. In this way, the 3D object detection is implemented without being completely dependent on a neural network, thus it is conducive to facilitating an application of the technical solutions of the present disclosure in an application scenario where computing resources are limited. The three operations in the present disclosure, which are constructing the pseudo 3D detection body, obtaining the depth information of the multiple vertices of the pseudo 3D detection body and forming the 3D detection body of the target object, may be implemented separately and an result produced by each operation may be used as an input parameter of another operation, thus it is helpful in reducing coupling between the three operations and optimizing an implementation process of the 3D object detection in a convenient way.

It can be known that the technical solutions provided in the present disclosure are beneficial to improving accuracy in the 3D object detection with the consumption of relatively few computing resources, thus it is conducive to improving safety in smart driving on the premise of low implementation costs.

In one or more embodiments of the present disclosure, 3D coordinates of at least four vertices of the pseudo 3D detection body are determined according to 2D coordinates and depth information of the at least four vertices. If the above at least four vertices are specifically eight vertices, 3D coordinates of the eight vertices of the 3D detection body are obtained in the present disclose, thus it is possible to obtain the 3D detection body of the target object. If a number of the above at least four vertices is less than eight, 3D coordinates of other vertices can be determined according to a positional relationship (such as a parallel relationship, a perpendicular relationship and an equal-height relationship) between edges of the pseudo 3D detection body. The above at least four vertices include: vertices on a top face of the pseudo 3D detection body and vertices on a bottom face of the pseudo 3D detection body. In other words, the at least four vertices include vertices on two horizontal planes of the pseudo 3D detection body.

In one or more embodiments of the present disclosure, the 3D detection body of the target object can be firstly constructed in the 3D space according to 2D coordinates and depth information of each end point of at least two vertical edges of the pseudo 3D detection body.

For example, in the present disclosure, 3D coordinates of four end points of two vertical edges (such as two vertical edges on a diagonal line of the top face or the bottom face) of the pseudo 3D detection body can be determined firstly according to 2D coordinates of each of the end points of the two vertical edges and depth information of the four end points of the two vertical edges; and then 3D coordinates of four end points of the other two vertical edges of the pseudo 3D detection body are determined according to a positional relationship between the two vertical edges and the other two vertical edges. In the present disclosure, the two vertical edges, having the 3D coordinates of their end points firstly determined, can include: a vertical edge nearest to the image capturing device that captures the image to be processed. Since the obtained depth information of the end points of the vertical edge nearest to the image capturing device is usually more accurate, the 3D coordinates of the end points determined according to the depth information are also usually more accurate, and so are the 3D coordinates of other end points obtained according to the 3D coordinates of such end points. Thus, it is conducive to improving accuracy of the 3D detection of the target object.

For another example, in the present disclosure, 3D coordinates of six end points of three vertical edges of the pseudo 3D detection body can be determined firstly according to 2D coordinates of each of the end points of the three vertical edges and depth information of the six end points of the three vertical edges; and then 3D coordinates of two end points of a remaining vertical edge of the pseudo 3D detection body are determined according to a positional relationship between the above three vertical edges and the remaining vertical edge in the pseudo 3D detection body. The above three vertical edges may include: three vertical edges nearest to the image capturing device that captures the image to be processed. Since the obtained depth information of the end points of the vertical edges nearest to the image capturing device is usually more accurate, the 3D coordinates of the end points determined according to the depth information are also usually more accurate, and so are the 3D coordinates of the other end points obtained according to the 3D coordinates of such end points. It can be known that the manner is also conducive to the improvement of the accuracy of the 3D detection of the target object.

In one or more embodiments of the present disclosure, with respect to any vertical edge of the pseudo 3D detection body, 3D coordinates of two end points of the vertical edge in the 3D space can be calculated according to the parameter of the image capturing device that captures the image to be processed, 2D coordinates and depth information of the two endpoints of the vertical edge.

For example, the above-obtained depth value of each end point of the vertical edge is converted to a distance in the 3D space, which can be regarded as a distance between the end point of the corresponding edge and the image capturing device; then the 3D coordinates of each end point are calculated using a formula (5) below:

$$P \times [X, Y, Z]^T = w \times [u, v, 1]^T \quad (5)$$

In the above formula (5), P represents the parameter of the image capturing device; X, Y, Z represent the 3D coordinates of the end point, which are also 3D coordinates of the end point in the 3D space of the real world; Z can be substituted in the above-obtained depth information of the end point; u and v represent the 2D coordinates of the end point, which are the 2D coordinates of the end point in a coordinate system in the image to be process; and w represents a scaling factor that can be equal to Z.

If P is shown as a 3×3 matrix below:

$$\begin{pmatrix} a_{11} & a_{12} & a_{13} \\ a_{21} & a_{22} & a_{23} \\ a_{31} & a_{32} & a_{33} \end{pmatrix},$$

the above formula (5) can be shown in a form of a formula (6) below:

$$\begin{cases} a_{11} \times X + a_{12} \times Y + a_{13} \times Z = w \times u \\ a_{21} \times X + a_{22} \times Y + a_{23} \times Z = w \times v \\ a_{31} \times X + a_{32} \times Y + a_{33} \times Z = w \end{cases} \quad (6)$$

Figure 6:
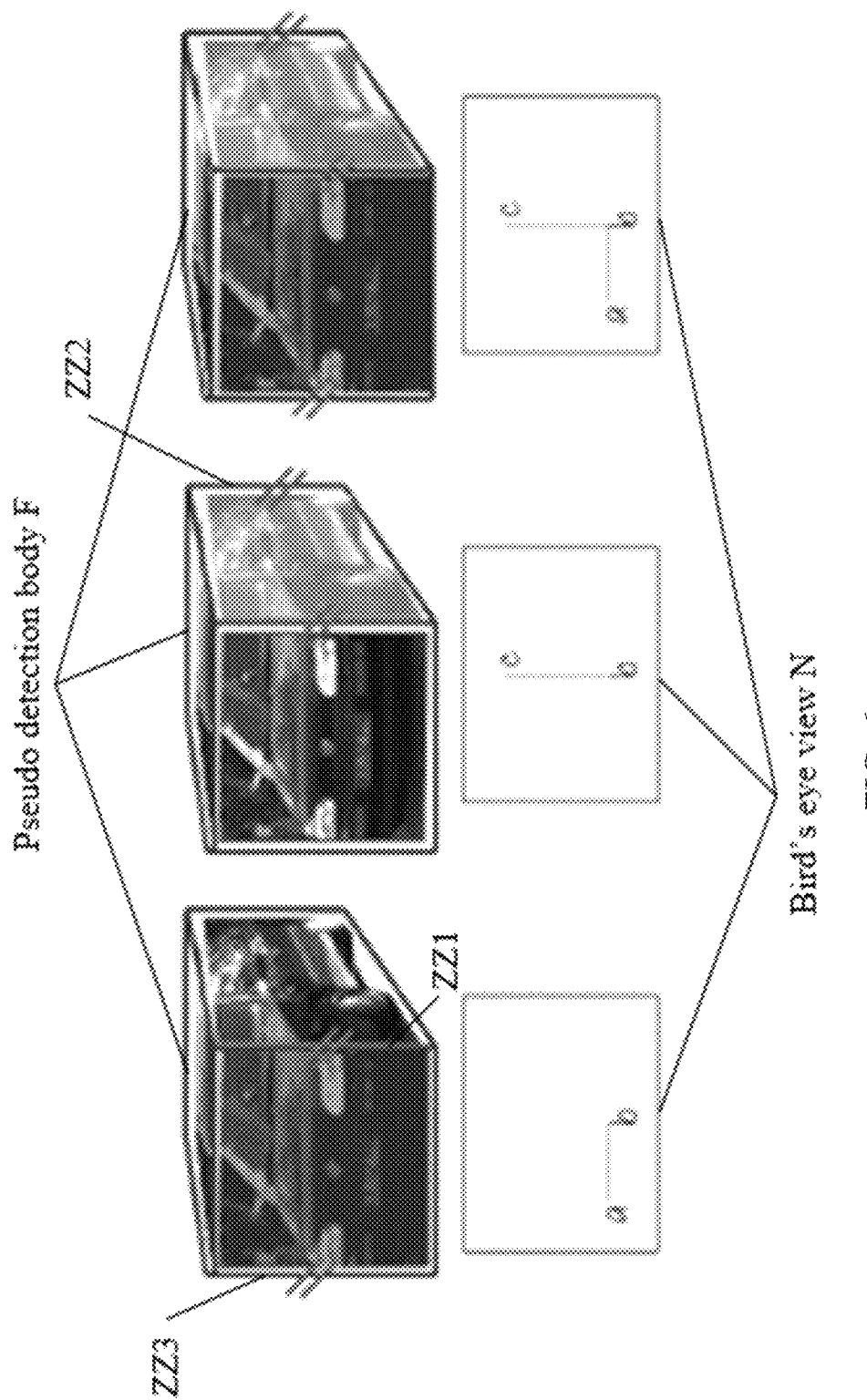
FIG. 6 is a schematic diagram illustrating a pseudo 3D detection body according to the present disclosure.

After variables X, Y and w are solved by substituting the 2D coordinates of multiple end points into the above formula (6) (surely, when w is equal to Z, the variables X and Y can be solved), the 3D coordinates (X, Y, Z) of the end point are obtained. In the present disclosure, the 3D coordinates of all the end points (such as 8 end points) of the pseudo 3D detection body can be obtained using the above formula (6) and the 3D coordinates of a part of the end points of the pseudo 3D detection body can also be obtained using the above formula (6); then the 3D coordinates of the other part of end points of the pseudo 3D detection body are obtained according to relationships between each vertical edge of the 3D detection body, which include a perpendicular relationship, a parallel relationship and an equal-height relationship and the like. For example, in FIG. 6, a third pillar ZZ3 of a pseudo 3D detection body F corresponds to a point a in a bird's eye view N, a first pillar ZZ1 of the pseudo 3D detection body F corresponds to a point b in the bird's eye view N and a second pillar ZZ2 of the pseudo 3D detection body F corresponds to a point c in the bird's eye view N. The point a and the point b are connected to form a line ab, the point b and the point c are connected to form a line bc, and the line ab is perpendicular to the line bc. A point corresponding to a fourth pillar in the bird's eye view can be obtained by the parallel relationship and the perpendicular relationship, and thus depth information of two end points of the fourth pillar can be determined, and finally 3D coordinates of the two end points in the 3D space are calculated.

As a basic computer vision task such as road segmentation and semantic segmentation is not needed in the above manner, the 3D detection body can be constructed for the target object quickly in the present disclosure, which involves a lower implementation cost and low consumption of the computing resources. In the present disclosure, since the 3D detection body is constructed based on the key points of the target object and a process of constructing the 3D detection is not relevant to factors such as whether the target object is on the ground, a phenomenon, such as inability to implement 3D object detection due to that the target object is in application scenarios other than the ground, can be avoided efficiently in the present disclosure, thus it is conducive to broadening the application scope of the 3D object detection.

In one or more embodiments, in an application scenario where the above constructed 3D detection body needs to be corrected, the above constructed 3D detection body can be called an initial 3D detection body (such as an initial 3D rectangular solid). For example, in the present disclosure, the pseudo 3D detection body can be at least determined as a constraint condition of the 3D detection body to adjust the initial 3D detection body so that a final 3D detection body (such as a final 3D rectangular solid) of the target object is obtained.

In one or more embodiments of the present disclosure, each vertex of the initial 3D detection body can be projected on the 2D plane so that a projection graph of the initial 3D detection body on the 2D plane is obtained. In the present disclosure, an overlap area between a graphic projection region and the pseudo 3D detection body on the 2D plane may be changed by adjusting the initial 3D detection body in the 3D space. For example, the overlap area can be made as large as possible in the present disclosure. For another example, an intersection over union between the region of the projection graph and the pseudo 3D detection body on the 2D plane is made as large as possible in the present disclosure.

In one or more embodiments, a manner of changing the overlap area includes: a position of the 3D detection body in the 3D space (such as a left/right position, an upper/lower position) is adjusted to make the overlap area between the pseudo 3D detection body and the graphic projection region of the initial 3D detection body projected on the 2D plane maximal. For example, the graphic projection region of the initial 3D detection body projected on the 2D plane is made to completely cover the pseudo 3D detection body; for another example, the pseudo 3D detection body is made to completely cover the graphic projection region of the initial 3D detection body projected on the 2D plane.

In one or more embodiments, in the present disclosure a manner of changing the overlap area can also include: a size of the initial 3D detection body in the 3D space is adjusted so that the graphic projection region of the adjusted initial 3D detection body projected on the 2D plane is as consistent with a graphic region of the pseudo 3D detection body as possible. When the initial 3D detection body is projected on a 2D space, if a ratio of a length value/a width value/a height value of the resulting projection graph to the length value/ the width value/the height value of the pseudo 3D detection body does not meet a preset ratio (for example, the preset ratio is between 0.9 and 1.1), the length value/the width value/the height value of the initial 3D detection in the 3D space can be adjusted in the present disclosure so that the adjusted ratio of the length value/the width value/the height value of the projection graph of the 3D detection body projected in the 2D space to the length value/the width value/the height value of pseudo 3D detection body meets the preset ratio, or the projection graph and the pseudo 3D detection body have exactly the same length value/width value/height value.

Since the key points of the target object in the image to be processed can be detected with a relatively high accuracy and detection is relatively fast, the pseudo 3D detection body can be constructed with a higher accuracy and quickly on the 2D plane using the key points of the target object. In the present disclosure, the initial 3D detection body in the 3D space can be adjusted and corrected using the pseudo 3D detection body, thus it is conducive to improving accuracy in constructing the 3D detection body in the 3D space for the target object.

In one or more embodiments of the present disclosure, a length-to-width-to-height ratio preset for the target object can also be determined as a constraint condition of the initial 3D detection body so that correction processing can be performed on the initial 3D detection body in the 3D space according to the constraint condition. For example, in the case that the target object is a four-wheeled motor vehicle, a length-to-width-to-height ratio of the four-wheeled motor vehicle can be preset as 2:1:1 in the present disclosure so that when the length-to-width-to-height ratio of the initial 3D detection body is not in a certain range around 2:1:1, the length, the width and height of the initial 3D detection body can be adjusted to keep the adjusted length-to-width-to-height ratio of the initial 3D detection body within the range.

In one or more embodiments, a 2D target detection frame of the target object in the image to be process can also be determined as a constraint condition of the initial 3D detection body so that adjustment processing can be performed on the initial 3D detection body in the 3D space according to the constraint condition. For example, in the present disclosure in the case that the target object is a four-wheeled motor vehicle, a detection frame (which can also be called a 2D-based circumscribed frame of the four-wheeled motor vehicle) of the four-wheeled motor vehicle can be determined as a constraint condition of the initial 3D detection body to adjust a position and/or the length, the width and the height of the initial 3D detection body so that the projection graph of the 3D detection body projected in the 2D space can completely be included in the detection frame of the four-wheeled motor vehicle. Since the 2D target detection frame of the target object is usually accurate, it is conducive to improving the accuracy of the 3D object detection by using the 2D target detection frame as a constraint condition to adjust the initial 3D detection body.

In one or more embodiments of the present disclosure, when the 3D object detection is performed respectively on multiple images to be processed (such as video frames in a video) which are temporally correlated, smoothing processing can be performed on the 3D detection body (such as the adjusted and the corrected 3D detection body) of a same target object in the multiple images to be processed. The smoothing processing can includes at least one of: smoothing processing on a length, a width and a height of the 3D detection body, smoothing processing on a motion direction of the 3D detection body, smoothing processing on a central point of a bird's eye view of the 3D detection body or smoothing processing on vertices (such as eight vertices) of the 3D detection body. The smoothing processing, performed on the 3D detection body of the same target object in the multiple images to be processed, is conducive to improving the accuracy of 3D object detection and avoiding a phenomenon that the target object shakes violently in adjacent video frames, thereby improving safety of smart driving.

In the present disclosure, in a process of implementing the smooth processing, parameters, such as a length, a width, a height, a motion direction of a 3D detection body of a target object in a current image to be processed, and a central point or vertices of the bird's eye view of the target object in the current image to be processed, are predicted using multiple to-be-processed historic images (such as 5 or 6 or 7 historic video frames) that are prior to the current to-be-processed image and using a corresponding fitting function, so as to perform the smoothing processing. The fitting function in the present can include but is not limited to: a quadratic function, a cubic exponential function or a logarithmic function and the like.

An example of a quadratic function as a fitting function, is shown in a formula (7) below:

$$x=f(t)=at^2+bt+c. \qquad (7)$$

In the formula (7), x represents a value of the historic video frames used in optimal fitting. If the fitting is performed using 5 historic video frames, $x=(x_1, x_2, x_3, x_4, x_5)$, and t represents times corresponding to the historic video frames. If the fitting is performed using 5 historic video frames, $t=(t_1,t_2,t_3,t_4,t_5)$, and a, b, c represent coefficients of the quadratic functions.

In the present disclosure, a, b and c in the formula (7) can be obtained firstly using the multiple historic video frames and then a prediction result pred of the current video frame is obtained using the formula (7).

In the present disclosure, parameters such as a length, a width, a height, a motion direction, a central point of a bird's eye view or vertices of a 3D detection body of a target object in the current video frame are adjusted accordingly using a weighting manner to implement the corresponding smoothing processing. For example, in the present disclosure, the parameters such as the length, the width, the height, the motion direction, the central point or the vertex of the bird's eye view of the 3D detection body of the target object in the current video frame can be adjusted using a formula (8) below.

$$x_6=\alpha*pred+\rho*x_6'. \qquad (8)$$

In formula (8), α represents a weight corresponding to the prediction result, pred represents the prediction result, ρ represents a weight corresponding to a 3D object detection result of the current video frame, $x_6$ represents the 3D object detection result of the current video frame, and $x_6'$ represents a 3D object detection result of the current video frame subjected to the smoothing processing.

The value of the weight can be determined according to an actual requirement. For example, when there is a slight difference (for example, the difference is no greater than a preset value) between the prediction result and the 3D object detection result of the current video frame, it can be set that α=0.5 and ρ=0.5; for another example, when there is a bigger difference (for example, the difference reaches the preset value) between the prediction result and the 3D object detection result of the current video frame, it can be set that α=0.8 and ρ=0.2 or α=0.7 and ρ=0.3. Specific value of the weight is not limited in the disclosure.

In one or more embodiments, information of the target object can be determined according to the 3D detection body of the target object. The information of the target object can include but is not limited to: information of a direction that the target object faces, spatial size information of the target object, information of a lane where the target object is on, detection information of a motion of the target object, information of a distance between the target object and an image capturing device that captures the image to be processed, information of an orientation between the target object and the image capturing device that captures the image to be processed and the like.

In the case that the target object is a two-wheeled motor vehicle, a two-wheeled non-motor vehicle, a two-wheeled motor vehicle and its rider, or a two-wheeled non-motor vehicle and its rider, a flowchart of one embodiment of the 3D object detection method in the present disclosure is illustrated in FIG. 7.

In operation S700, the 2D coordinates of the at least one predetermined key point of the target object in the image to be processed is obtained.

In one or more embodiments, the key points (including key point numbers and 2D coordinates) of the target object in the image to be processed can be obtained using the neural network in the present disclosure, and all the obtained key points can be determined as the at least one predetermined key point of the target object in the present disclosure. Screening can also be performed on all the key points obtained by the neural network to determine key points with a credibility greater than a preset credibility threshold as the at least one predetermined key point of the target object among all the key points. Relevant description in operation S100 of the above embodiment can be referred to for details, which will not be elaborated herein.

In operation S710, a lengthwise section of the target object is determined according to the 2D coordinates of the at least one predetermined key point. Herein, the length of the target object corresponds to the length of the pseudo 3D detection body, and the lengthwise section of the target object is a section based on the 2D plane.

In one or more embodiments, the lengthwise direction of the target object in the present disclosure refers to: a direction from a head of a vehicle to a tail of the vehicle. In the present disclosure, in the case that the target object is a two-wheeled motor vehicle or a two-wheeled non-motor vehicle, the lengthwise section (such as a section illustrated in FIG. 8) of the target object can be determined using 2D coordinates of at least two of: a key point in a center of a front wheel, a key point in a center of a rear wheel, a key point on a front end of the front wheel, a key point on a rear end of the rear wheel, a grounded key point of the front wheel, a grounded key point of the rear wheel, a key point on a support of a vehicle seat, a key point on a pedal bearing, a key point in a center of a vehicle handlebar, key points on two ends of the vehicle handlebar.

For example, a distance: $L=\sqrt{(x_1-x_2)^2+(y_1-y_2)^2}$ between the grounded key point of the front wheel and the grounded key point of the rear wheel is determined firstly according to the 2D coordinates of the grounded key point of the front wheel: $(x_1, y_1)$ and 2D coordinates of the grounded key point of the rear wheel: $(x_2, y_2)$, and then a length of the section is formed by extending outwards from the grounded key point of the front wheel and the grounded key point of the rear wheel respectively along a line connecting the two grounded key points. The length of the section may be (1+2n)L, where n is a preset extension rate which is greater than 0 and less than or equal to a decimal no greater than 1 (such as 0.3, 0.2). For example, the length of section equal to 1.2L is formed by extending outwards by 0.1L from the grounded key point of the front wheel and the grounded key point of the rear wheel respectively along the line connecting the two grounded key points; and then a vertical distance from the key point in the center of the vehicle handlebar to the connecting line is determined as a height of the section, so that the section is formed. In some application scenarios, the vertical distance in the example can be determined by following operations: if a line made from the key point in the center of the vehicle handlebar along a direction of the gravity intersects with the above connecting line, a distance between the key point in the center of the vehicle handlebar and the intersection point of the two lines is the vertical distance. In addition, if the at least one predetermined key point further includes the key point on the front end of the front wheel and the key point on the rear end of the rear wheel, a length of the outward extension from the grounded key point of the front wheel and the grounded key point of the rear wheel respectively along the line connecting the two grounded key points can be determined according to a position of the key point on the front end of the front wheel and a position of the key point on the rear end of the rear wheel.

In one or more embodiments, in the case that the target object is a two-wheeled motor vehicle and its rider or a two-wheeled non-motor vehicle and its rider, in the present disclosure, the lengthwise section (such as a section illustrated in FIG. 9) of the target object can be determined using 2D coordinates of at least two of: a key point in a center of a front wheel, a key point in a center of a rear wheel, a key point on a front end of the front wheel, a key point on a rear end of the rear wheel, a grounded key point of the front wheel, a grounded key point of the rear wheel, a key point on a support of a vehicle seat, a key point on a pedal bearing, a key point in a center of a vehicle handlebar, key points on two ends of the vehicle handlebar, a key point on top of the rider's head.

For example, a distance $L=\sqrt{(x_1-x_2)^2+(y_1-y_2)^2}$ between the grounded key point of the front wheel and the grounded key point of the rear wheel is determined firstly according to the 2D coordinates $(x_1, y_1)$ of the grounded key point of the front wheel and 2D coordinates $(x_2, y_2)$ of the grounded key point of the rear wheel, and then a length of the section is formed by extending outwards from the grounded key point of the front wheel and the grounded key point of the rear wheel respectively along a line connecting the two grounded key points. The length of the section may be (1+2n)L, where n is a preset extension rate which is greater than 0 or less than or equal to a decimal no greater than 1 (such as 0.3, 0.2). For example, the length of section equal to 1.2L is formed by extending outwards by 0.1L from the grounded key point of the front wheel and the grounded key point of the rear wheel respectively along the line connecting the two grounded key points; and then a vertical distance from the key point on top of the rider's head to the connecting line is determined as a height of the section so that the section is formed. In some application scenarios, the vertical distance in the example can be determined by following operations: if a line made from the key point on top of the rider's head along the direction of the gravity intersects with the above connecting line, a distance between the key point on top of the rider's head and the intersection point of the two lines is the vertical distance. In addition, if the at least one predetermined key point further includes the key point on the front end of the front wheel and the key point on the rear end of the rear wheel, a length of the outward extension from the grounded key point of the front wheel and the grounded key point of the rear wheel respectively along the line connecting the two grounded key points can be determined according to a position of the key point on the front end of the front wheel and a position of the key point on the rear end of the rear wheel.

In operation S720, the thickness of the target object is determined. The thickness is a thickness based on the 2D plane.

In one or more embodiments of the present disclosure, the thickness of the target object can be determined by the length or the height of the section. For example, the thickness of the target object can be determined according to a preset reduction rate (which may equal to 0.2, 0.3, 0.4 or 0.5 and the like) of the length or the height of the section.

In one or more embodiments of the present disclosure, the thickness of the target object can be determined according to the 2D coordinates of the at least one predetermined key points that are not included in the section. For example, in the present disclosure, when the target object is a two-wheeled motor vehicle or a two-wheeled non-motor vehicle, a distance between two ends of a vehicle handlebar can be calculated according to 2D coordinates of the two ends of the vehicle handlebar and determined as the thickness of the target object. For another example, in the present disclosure, when the target object is a two-wheeled motor vehicle and its rider or a two-wheeled non-motor vehicle and its rider, a distance between two key points on shoulders of the rider can be calculated according to 2D coordinates of the two key points on the shoulders of the vehicle rider and determined as the thickness of the target object.

In operation S730, the pseudo 3D detection body of the target object in the 2D space is formed by extending, with each vertex of the section as a starting point, the section in two directions perpendicular to the section respectively by a half of the thickness of the target object.

Figure 8:
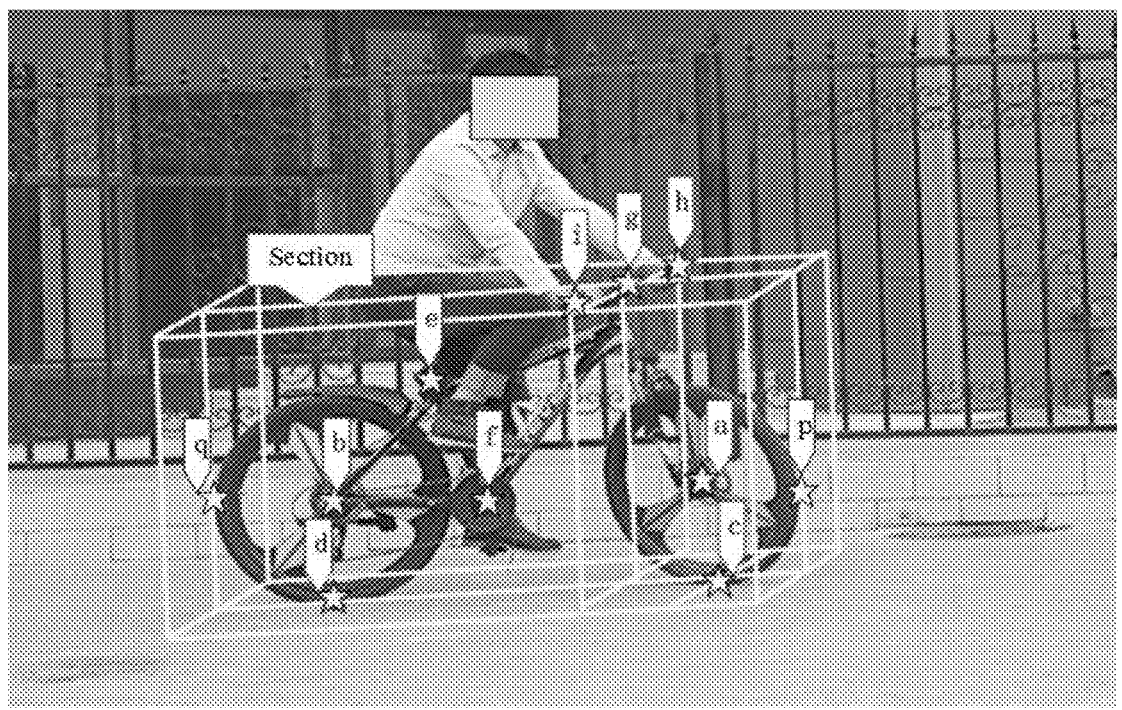
FIG. 8 is a schematic diagram illustrating a pseudo 3D detection body constructed according to a section and a thickness according to the present disclosure.
Figure 9:
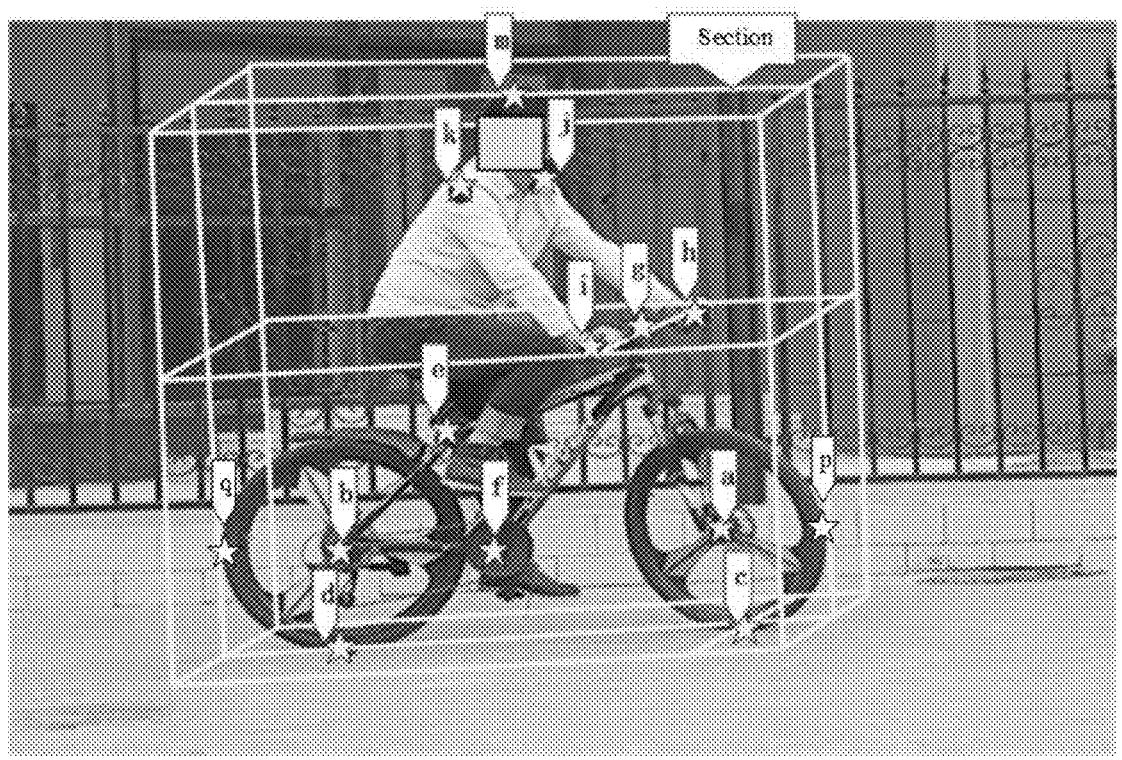
FIG. 9 is a schematic diagram illustrating another pseudo 3D detection body constructed according to a section and a thickness according to the present disclosure.

According to some embodiments, in the present disclosure, a normal vector of the section can be determined firstly, and the pseudo 3D detection body of the target object in the 2D space is formed by extending, based on each vertex of the section, the section along a direction of the normal vector and an opposite direction of the normal vector respectively by a half of the thickness of the target object and then by connecting eight points formed as a result of the extension. For example, when the target object is a two-wheeled non-motor vehicle, the constructed pseudo 3D detection body of the target object in the 2D space is illustrated in FIG. 8. For another example, when the target object is a two-wheeled non-motor vehicle and its rider, the constructed pseudo 3D detection body of the target object in the 2D space is illustrated in FIG. 9.

In operation S740, the depth information of the multiple vertices of the pseudo 3D detection body is obtained. Description of operation S120 of the above implementation can be referred to for details of operation S740, which will not be elaborated herein.

In operation S750, the 3D detection body of the target object in the 3D space is determined according to the depth information of the multiple vertices of the pseudo 3D detection body. Description of operation S130 of the above implementation can be referred to for details of operation S750, which will not be elaborated herein. In addition, the implementation illustrated in FIG. 7 can also include a correcting process and a smoothing processing process for the initial 3D detection body, which will not be elaborated herein.

In the case that the target object is a motor vehicle with more than two wheels (such as a four-wheeled motor vehicle) or a non-motor vehicle with more than two wheels (such as a four-wheeled man-powered vehicle), a flowchart of an embodiment of the 3D object detection method according to the present disclosure is illustrated in FIG. 10.

In operation S1000, the 2D coordinates of the at least one predetermined key point of the target object in the image to be processed is obtained.

In one or more embodiments of the present disclosure, the key points of the target object in the image to be processed (including numbers and 2D coordinates of the key points) can be obtained using the neural network. For example, in the present disclosure, the 2D target detection frame of the target object in the image to be processed can be obtained firstly using the neural network, and then the image to be processed is segmented according to the 2D target detection frame and finally the key point detection is performed on the segmented image blocks using the neural network so that the key points of the target object (such as the key point numbers and the 2D coordinates of the key points) can be obtained. According to some embodiments, in the present disclosure, all the obtained key points can be determined as the at least one predetermined key point of the target object. Alternatively, all the obtained key points can also be screened, and key points with a credibility greater than the preset credibility threshold can be determined as the at least one predetermined key point. Relevant description in operation S100 of the above embodiment can be referred to for details, which will not be elaborated herein.

In operation S1010, at least one structural plane of the target object is determined according to predetermined belonging relationships between the at least one predetermined key point and planes included by the target object.

In one or more embodiments of the present disclosure, one structural plane of the target object can be determined and be used as a basis of the construction of the pseudo 3D detection body. The structural plane can be called a basic plane. In the present disclosure, two structural planes of the target object, i.e., a basic plane and a quasi-basic plane, can be determined and the pseudo 3D detection body is constructed based on the basic plane and the quasi basic plane.

In one or more embodiments, any predetermined key point in the implementation usually corresponds to one or two or three faces of the pseudo 3D detection body (such as a 3D rectangular solid). Likewise, one predetermined key point usually corresponds to one or more faces of the 3D detection body. In other words, there is a correspondence relationship between the at least one predetermined key point and the faces of the pseudo 3D detection body and there is also a correspondence relationship between the at least one predetermined key point and the faces of the 3D detection body.

As illustrated in FIG. 2, the "lower front left," the "upper front left," the "lower front right," the "upper front right" and the key point of the front left vehicle light and the key point of the front right vehicle light correspond to a front face of the pseudo 3D detection body and a front face of the 3D detection body, that is to say, the six key points, i.e., the "lower front left," the "upper front left," the "lower front right," the "upper front right" and the key point of the front left vehicle light and the key point of the front right vehicle light, can be seen from a position in the front of the four-wheeled motor vehicle. The "lower front left," the "upper front left," the "lower rear left," the "upper rear left," the "front left wheel," the "rear left wheel," the key point of the front left vehicle light, the key point of the rear left vehicle light correspond to a left face of the pseudo 3D detection body and a left face of the 3D detection body, that is to say, the eight key points, i.e., the "lower front left," the "upper front left," the "lower rear left," the "upper rear left," the "front left wheel," the "rear left wheel," the key point of the front left vehicle light, the key point of the rear left vehicle light, can be seen from a position on the left of the four-wheeled motor vehicle. The "lower rear left," the "upper rear left," the "lower rear right," the "upper rear right," the key point of the rear left vehicle light and the key point of the key point of the rear right vehicle light correspond to a rear face of the pseudo 3D detection body and a rear face of the 3D detection body, that is to say, the six key points, i.e., the "lower rear left," the "upper rear left," the "lower rear right," the "upper rear right," the key point of the rear left vehicle light and the key point of the key point of the rear right vehicle light, can be seen from a position behind the four-wheeled vehicle. The "lower front right," the "upper front right," the "lower rear right," the "upper rear right," the "front right wheel," the "rear right wheel," the key point of the front right vehicle light and the key point of the rear right vehicle right correspond to a right face of the pseudo 3D detection body and a right face of the 3D detection body, that is to say, the eight key points, i.e., the "lower front right," the "upper front right," the "lower rear right," the "upper rear right," the "front right wheel," the "rear right wheel," the key point of the front right vehicle light and the key point of the rear right vehicle right can be seen from a position on the right of the four-wheeled vehicle. The "lower front left," the "upper front left," the "lower front right," the "upper front right" the "lower rear left," the "upper rear left," the "lower rear right," the "upper rear right," the key point of the front left vehicle light, the key point of the front right vehicle light, the key point of the rear left vehicle light, the key point of the rear right vehicle light correspond to a top face of the pseudo 3D detection body and a top face of the 3D detection body, that is to say, the twelve key points, i.e., the "lower front left," the "upper front left," the "lower front right," the "upper front right" the "lower rear left," the "upper rear left," the "lower rear right," the "upper rear right," the key point of the front left vehicle light, the key point of the front right vehicle light, the key point of the rear left vehicle light, the key point of the rear right vehicle light can be seen from a position above the four-wheeled motor vehicle. The "lower front left," the "lower front right," the "lower rear left," the "lower rear right," the "front left wheel," the "front right wheel," the "rear left wheel" and the "rear right wheel" correspond to a bottom face of the pseudo 3D detection body and a bottom face of 3D detection body, that is to say, the eight key points, i.e., the "lower front left," the "lower front right," the "lower rear left," the "lower rear right," the "front left wheel," the "front right wheel," the "rear left wheel" and the "rear right wheel," can be seen from a position behind the four-wheeled motor vehicle.

It should be particularly noted that, the correspondence relationship between the at least one predetermined key point and the top and bottom faces of the pseudo 3D detection body and of the 3D detection body may not be set in the present disclosure. In addition, the above correspondence relationship between the at least one predetermined key point and corresponding faces of the pseudo 3D detection body and of the 3D detection body is only described in examples and not limited to the above examples. For example, the "lower front left," the "upper front left," the "lower front right," the "upper front right," the "front left wheel" and the "front right wheel" may correspond to the front face of the pseudo 3D detection body and the front face of the 3D detection body.

In one or more embodiments, a manner of determining the basic plane of the target object in the image to be processed in the present disclosure includes but is not limited to the following operation: firstly, a quality of each of the faces corresponding to one predetermined key point is determined according to the face; and then a face with a highest quality is determined as the basic plane of the target object. A manner of determining the qualities of the faces in the present disclosure includes but is not limited to the following listed three exemplary manners.

In one or more embodiments, a manner of determining the quality of each face can be: a number of at least one predetermined key point corresponding to each face is calculated and determined as a score of the face. As a result, the larger the number of the at least one predetermined key point corresponding to a face is, the higher the score of the face is. For example, if all of the key point 1, the key point 2, the key point 3, the key point 4, the key point 5, the key point 6, the key point 7 and the key point 8 in FIG. 2 are assumed to be the detected at least one predetermined key point; as the key point 1, the key point 2, the key point 3, the key point 4, the key point 5 and the key point 6 correspond to the left face of the four-wheeled motor vehicle while the key point 1, the key point 2, the key point 7, and the key point 8 correspond to the front face of the four-wheeled motor vehicle. Thus, the left face of the four-wheeled motor vehicle has a highest score, sand can be determined as the basic plane.

In one option example, the manner of determining the quality of each face can also be: a sum of credibility of the at least one predetermined key point corresponding to each face is calculated and determined as a score of the face. As a result, the larger the sum of the credibility corresponding to a face is, the higher the score of the face is.

In one or more embodiments, the manner of determining the quality of each face can also be: each face corresponds to a number of the at least one predetermined key point and a sum of credibility of the at least one predetermined key point, the number and the sum are calculated; in the present disclosure, the sum of the credibility of each face divided by the number of the at least one predetermined key point corresponding to the face is calculated. That is to say, an average credibility value of the at least one predetermined key point corresponding to each face is calculated; and the average credibility value of the at least one predetermined key point corresponding to the face is determined as a score of the face. As a result, the larger the average credibility value corresponding to a face is, the higher the score of the face is.

In one or more embodiments, a process of determining the quasi basic plane in the present disclosure includes but is not limited to: planes adjacent to the basic plane are determined, and with respect to the predetermined key points that do not belong to the basic plane, a number of predetermined key points not belonging to each of the planes adjacent to the basic plane is calculated; finally a plane with a greatest number of the predetermined key points is determined as a quasi-basic plane. This manner is conductive to reasonable selection of the quasi basic plane.

In operation S1020, the pseudo 3D detection body of the target object in the 2D space is constructed according to the structural plane and the coordinates of the at least one predetermined key point.

In one or more embodiments of the present disclosure, firstly, the basic plane is constructed on the 2D plane according to the 2D coordinates of the at least one predetermined key point, then a normal vector of the basic plane is determined and finally the pseudo 3D detection body is formed based on an extension of vertices of the basic plane along a direction of the normal vector. This implementation is conducive to constructing the pseudo 3D detection body quickly and accurately.

In one or more embodiments, the basic plane can be constructed using a regression network or a manner such as plane segmentation in the present disclosure. In addition, the basic plane can also be constructed on the 2D plane using a manner of making a line based on the at least one predetermined key point in the present disclosure. A process that the basic plane is constructed on the 2D plane using the manner of making the line based on the at least one predetermined key point can include but is not limited to at least one of following listed exemplary operations.

In one operation: a perpendicular line (i.e., a vertical line passing through a predetermined key point) is made on the 2D plane using the predetermined key point on the basic plane. One edge on the basic plane is located on the perpendicular line. An intersection point between the perpendicular line and one edge on one of other planes is one vertex of the basic plane.

In another operation, a line is made on the 2D plane by connecting two key points on the basic plane. The connecting line or the connecting line together with its extension line can be one edge on the basic plane. In other words, the two key points can be two vertices on the basic plane, or an intersection point between the extension line of the line connecting the two key points and one edge on one of the other planes is a vertex of the basic plane.

In yet another operation, a parallel line, which is a line parallel to another edge on the basic plane, is made using a key point on the basic plane. That is to say, the parallel line passing through the key point on the basic plane is made to be parallel to another edge on the basic plane. One edge on the basic plane is located on the parallel line. An intersection point between the parallel line and the above perpendicular line or an intersection point between the parallel line and one edge on one of other planes is a vertex of the basic plane.

In one or more embodiments, the implementation for determining the normal vector of the basic plane includes but is not limited to following three examples.

In a first example, the predetermined key points belonging to the basic plane are removed from all the predetermined key points, then a predetermined key point with a highest credibility is selected among the remaining predetermined key points, and finally a perpendicular line is made from the selected predetermined key point to the basic plane and determined as the normal vector of the basic plane.

In a second example, a line perpendicular to the basic plane is made using a predetermined key point on the quasi basic plane so that the perpendicular line is determined as the normal vector of the basic plane.

According to some embodiments, as illustrated in FIG. 2, all of the key point 1, the key point 2, the key point 3, the key point 4, the key point 5, the key point 6, the key point 7, the key point 8 and the "rear right wheel" are assumed to be the detected at least one predetermined key point and the "rear right wheel" is assumed to have a high credibility; in the above case, it is obvious that a key point detection error occurs for the "rear right wheel." In the present disclosure, a plane that is adjacent to the basic plane and includes a greatest number of the predetermined key points is determined as the quasi basic plane and the normal vector of the basic plane is obtained using the predetermined key points on the quasi basic plane. Thus, it is conducive to avoiding a phenomenon that a perpendicular line is made from the detected "rear right wheel" to the basic plane to obtain the normal vector of the basic plane, thereby facilitating the improvement of the accuracy in constructing the pseudo 3D detection body.

In a third example, if there are two predetermined key points which belong to a plane adjacent to the basic plane and a line connecting the two predetermined key points is located on an edge which is on the adjacent plane and perpendicular to the basic plane, a difference between coordinates of the two predetermined key points on the 2D plane can be determined as the normal vector of the basic plane. For example, in FIG. 2, if it is assumed that the left face of the four-wheeled motor vehicle is the basic plane, the front face of the four-wheeled motor vehicle is the quasi basic plane, the coordinates of the key point 7 on the 2D plane are $(u_7, v_7)$, the coordinates of the key point 1 on the 2D plane are $(u_1, v_1)$, then $(u_7-u_1, v_7-v_1)$ can be determined as the normal vector of the basic plane in the present disclosure.

Figure 11:
FIG. 11 is a schematic diagram illustrating a pseudo 3D detection body according to the present disclosure.

In one or more embodiments of the present disclosure, after the basic plane and its normal vector are determined, the vertices on the basic plane can be extended along the direction of the normal vector of the basic plane so that the extension may intersect with edges on other planes and finally cause the pseudo 3D detection body to be formed. For example, in FIG. 2, firstly, a first perpendicular line passing through the key point 1 and a second perpendicular line passing through the key point 4 are formed; then a first line, which passes through the key point 6 and the key point 5 simultaneously and intersects with the first perpendicular line and the second perpendicular line respectively, is formed; and finally a second line, which passes through the key point 2 or the key point 3 to be parallel to the first line and intersect with the two perpendicular lines respectively, is formed. As a result, four lines and four vertices of the basic plane are formed; and the normal vector of the basic plane is $(u_7-u_1, v_7-v_1)$. The normal vector is also a bottom edge of the quasi basic plane. In the present disclosure, a third perpendicular line passing through the key point 7 can be formed and a third line, which passes through the key point 7 and is parallel to the first line or the second line, is made. A top edge of the quasi basic plane is formed by extending a vertex in an upper left corner of the basic plane along the direction of the normal vector to intersect with the third perpendicular line. A line, which connects the key point 8 and an intersection point between the extension of the above vertex and the third perpendicular line, intersects with a line formed by extension of a vertex in an upper right corner of the basic plane along the direction of normal vector, at a point which a fourth perpendicular line is made to pass through. The fourth perpendicular line passing through the point will intersect with a line formed by extension of a vertex in a lower right corner of the basic plane along the direction of the normal vector. Therefore, the pseudo 3D detection body is formed in the 2D space. In the present disclosure, an example of the pseudo 3D detection body formed for the target object (the four-wheeled motor vehicle) in the image to be processed is illustrated in FIG. 11.

It should be particularly noted that the pseudo 3D detection body can be constructed in other manners. For example, the image to be processed or the 2D target detection frame of the target object in the image to be processed can be provided to a regression network to obtain the pseudo 3D detection body. A specific implementation process of constructing the 3D detection body is not limited in the present disclosure.

In operation S1030, the depth information of the multiple vertices of the pseudo 3D detection body is obtained. Description of operation S120 of the above implementation can be referred to for details of operation S1030, which will not be elaborated herein.

In operation S1040, the 3D detection body of the target object in the 3D space is determined according to the depth information of the multiple vertices of the pseudo 3D detection body. Relevant description of operation S130 of the above implementation can be referred to for details of operation S1040. In addition, the implementation illustrated in FIG. 10 can also include the correcting process and the smoothing processing process of the initial 3D detection body, which will not be elaborated herein.

Figure 12:
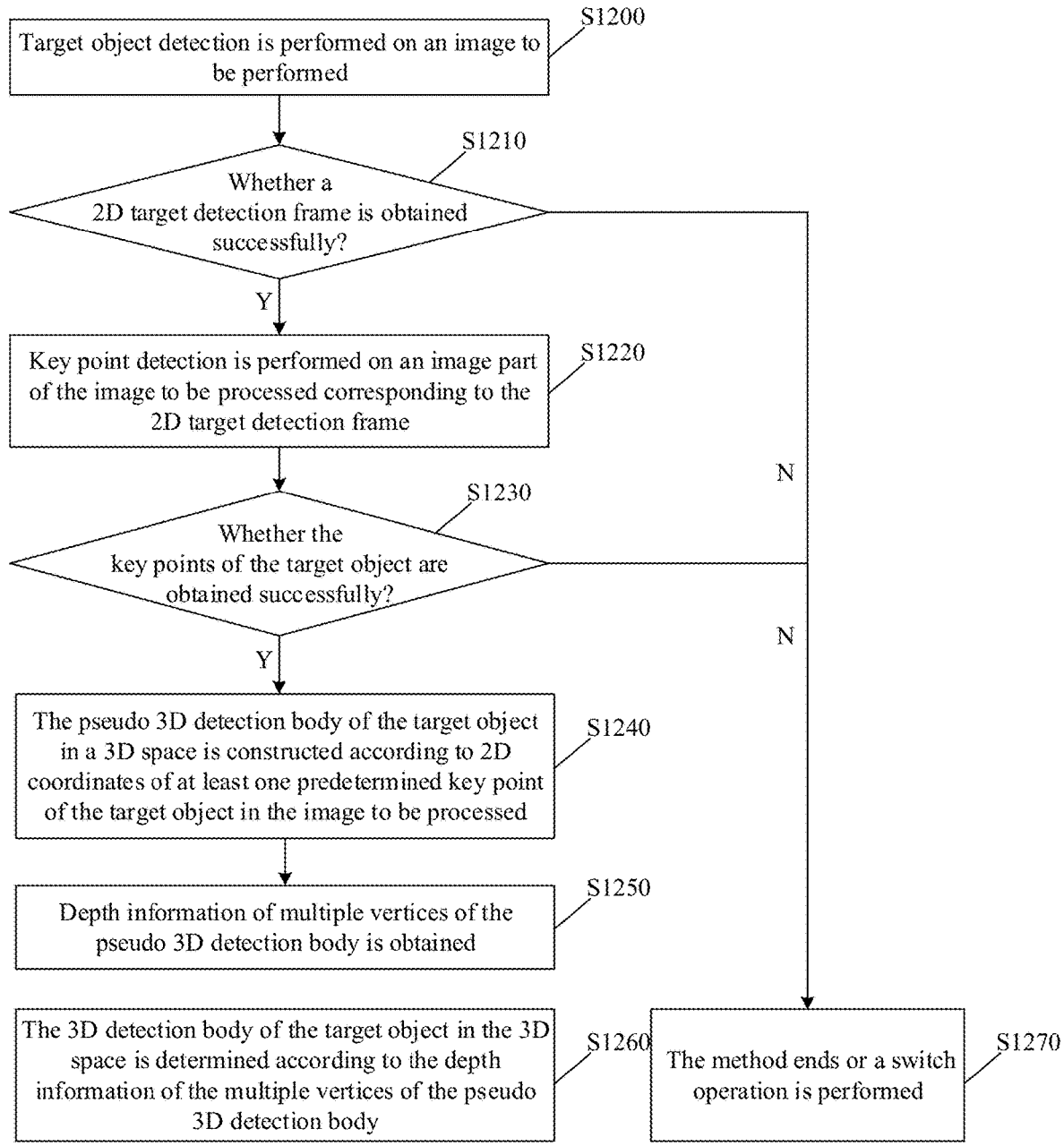
FIG. 12 is a flowchart illustrating another implementation of a 3D object detection method according to the present disclosure.

A flowchart of an embodiment of the 3D object detection method in the present disclosure is illustrated in FIG. 12.

In operation S1200, the target object detection is performed on the image to be processed. Relevant description of operation S100 of the above implementation can be referred to for details of operation S1200, which will not be elaborated herein.

In operation S1210, it is determined that whether the 2D target detection frame including the target object is obtained. If the 2D target detection frame is successfully obtained, operation S1220 should be performed, otherwise, operation S1270 should be performed.

In operation S1220, the key point detection of the target object is performed based on an image part of the image to be processed corresponding to the 2D target detection frame. Relevant description of operation S100 of the above implementation can be referred to for details of operation S1220, which will not be elaborated herein.

In operation S1230, it is determined that whether the at least one predetermined key point of the target object is obtained; if the at least one predetermined key point of the target object is obtained successfully, operation S1240 should be performed, otherwise, the operation S1270 should be performed.

In operation S1240, the pseudo 3D detection body of the target object in the 2D space is constructed according to the 2D coordinates of the at least one predetermined key point of the target object in the image to be processed. Relevant description of operation S110 of the above implementation can be referred to for details of operation S1240, which will not be elaborated herein.

In operation S1250, the depth information of the multiple vertices of the pseudo 3D detection body is obtained. Relevant description of operation S120 of the above implementation can be referred to for details of operation S1250, which will not be elaborated herein.

In operation S1260, the 3D detection body of the target object in the 3D space is determined according to the depth information of the multiple vertices of the pseudo 3D detection body. Description of operation S130 of the above implementation can be referred to for details of operation S1260. In addition, the operation can also include the correcting process and the smoothing processing process of the initial 3D detection body, which will not be elaborated herein.

In operation S1270, the 3D object detection processing in the present disclosure is no longer performed, which cause the method in the present disclosure to end here; According to some embodiments, a switch can be made to the 2D target detection method of an object or a process of the 3D detection of the target object using the point cloud data obtained by the radar range device.

Figure 13:
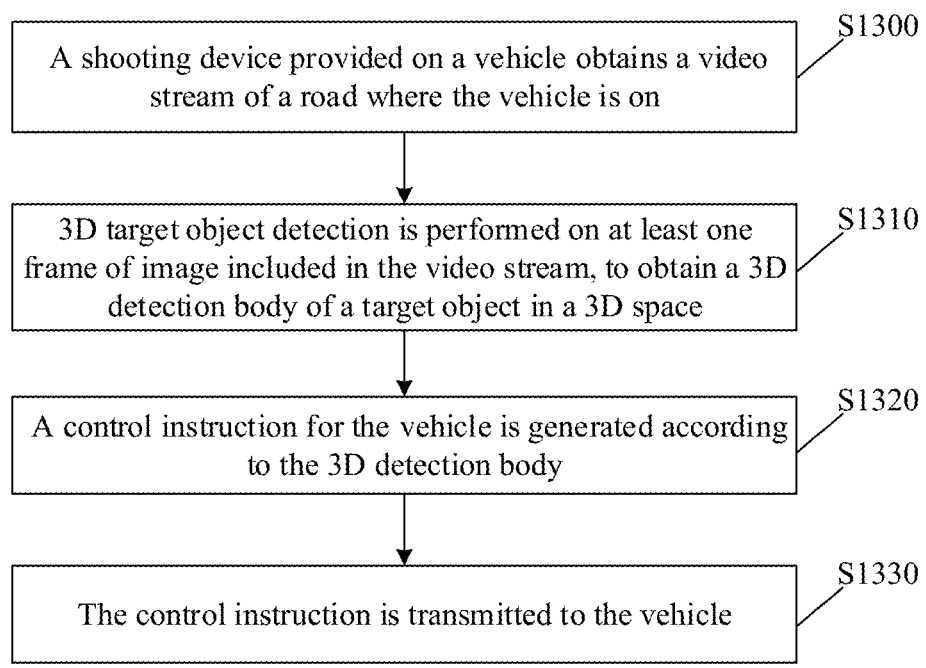
FIG. 13 is a flowchart illustrating an implementation of a method for controlling smart driving according to the present disclosure.

FIG. 13 is a flowchart illustrating an embodiment of a method for controlling smart driving according to the present disclosure. The method for controlling smart driving in the present disclosure can be applied to but is not limited to: an automatic driving environment (such as automatic driving which is not assisted by humans) or an assisted driving environment.

In operation S1300, an image capturing device arranged on a vehicle (such as a four-wheeled motor vehicle) captures a video stream of a road where the vehicle is. The image capturing device includes but is not limited to: an RGB-based image capturing device.

In operation S1310, the 3D detection of the target object is performed on at least one frame of images included by the video stream to obtain the 3D detection of the target object in the 3D space. Description of FIG. 1 or FIG. 10 in the above method implementation can be referred to for the detailed implementation process of the operation.

In operation S1310, a control instruction for the vehicle is generated according to the 3D detection body.

In one or more embodiments of the present disclosure, firstly information of the target object can be determined according to the 3D detection body of the target object. If the determined information of the target object includes at least one of: information of a direction that the target object faces (such as a direction that a front end of a vehicle faces), spatial size information of the target object (such as a 3D size of the target object in the real world), information of a lane where the target object is on (for example, the target object is on its left or right lane), predictive information of a motion of the target object (for example, the target object is accelerating), information of a distance between the target object and an image capturing device that captures the image to be processed (such as a straight distance between the target object and the image capturing device), or information of an orientation between the target object and the image capturing device that captures the image to be processed (such as angle between the target object and the Z-axis of the image capturing device, the control instruction for the vehicle is generated according to the information of the target object. The generated control instruction in the present disclosure includes but is not limited to: a control instruction for maintaining a speed, a control instruction for adjusting the speed (such as a decelerating driving instruction, an accelerating driving instruction), a control instruction for maintaining a direction, a control instruction for adjusting the direction (such as an instruction for turning left, an instruction for turning right, an instruction for moving to a left lane and an instruction for moving to a right lane), a honking instruction, a control instruction for an alert reminder or a control instruction for switching a driving mode (for example, a switch is made to an automatic cruise driving mode).

In operation S1130, the control instruction for the vehicle is transmitted to the vehicle.

Figure 14:
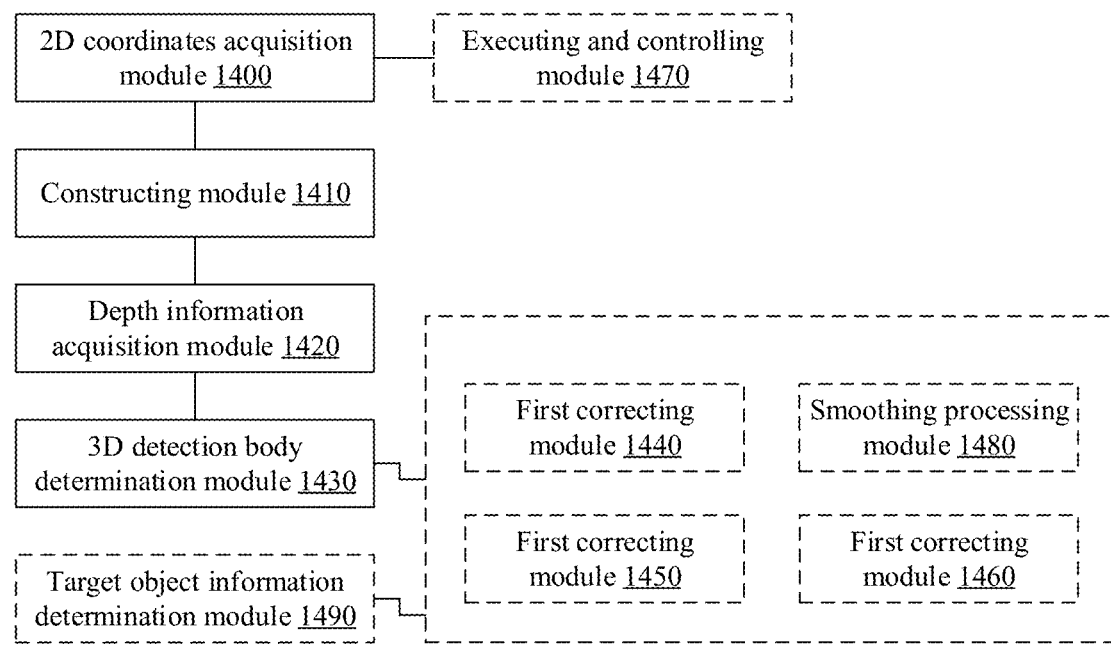
FIG. 14 is a schematic structural diagram illustrating an implementation of a 3D object detection device according to the present disclosure.

FIG. 14 is a schematic structural diagram illustrating an embodiment of a 3D object detection device according to the present disclosure; As illustrated in FIG. 14, the device includes: a 2D coordinates acquisition module 1400, a constructing module 1410, a depth information acquisition module 1420 and a 3D detection body determination module 1430. According to some embodiments, the device in the present disclosure may also include at least one of: a first correcting module 1440, a second correcting module 1450, a third correcting module 1460, an executing and controlling module 1470, a smoothing processing module 1480 or a target object information determination module 1490.

The 2D coordinates acquisition module 1400 is configured to obtain 2D coordinates of at least one predetermined key point of a target object in an image to be processed.

In one or more embodiments, the 2D coordinates acquisition module 1400 in the present disclosure can use a neural network to obtain the 2D coordinates of the at least one predetermined key point of the target object in the image to be processed. According to some embodiments, the 2D coordinates acquisition module 1400 can include: a key point acquisition sub-module and a screening sub-module. The key points acquisition sub-module is configured to perform target object detection on the image to be processed to obtain a 2D target detection frame including at least part of the target object before performing key point detection on an image part of the image to be processed corresponding to the 2D target detection frame In the case that the target object includes a two-wheeled motor vehicle and its rider, the 2D target detection frame obtained by the key points acquisition sub-module can be a 2D target detection frame including the two-wheeled motor vehicle or a 2D target detection frame including the two-wheeled motor vehicle and its rider. In the case that the target object includes a two-wheeled non-motor vehicle and its rider, the 2D target detection frame obtained by the key points acquisition sub-module can be a 2D target detection frame including the two-wheeled non-motor vehicle or a 2D target detection frame including the two-wheeled non-motor vehicle and its rider. The screening sub-module is configured to determine, as the at least one predetermined key point of the target object, one or more key points with a credibility greater than a preset credibility threshold among resulting key points obtained through the key point detection performed on the target object. The relevant description of the above operation S100 can be referred to for contents specifically included by the image to be processed, the target object and the at least one predetermined key point and detailed operations performed by the 2D coordinates acquisition module 1400.

The constructing module 1410 is configured to construct a pseudo 3D detection body of the target object in a 2D space according to the 2D coordinates of the at least one predetermined key point.

In one or more embodiments, the constructing module 1410 can include: a first sub-module and a second sub-module. The first sub-module is configured to determine a lengthwise section of the target object according to the 2D coordinates of the at least one predetermined key point. For example, in an application scenario where the target object is a two-wheeled motor vehicle or a two-wheeled non-motor vehicle, the first sub-module can determine a distance between a grounded key point of a front wheel and a grounded key point of a rear wheel according to 2D coordinates of the grounded key point of the front wheel and 2D coordinates of the grounded key point of the rear wheel, and extend outwards from the grounded key point of the front wheel and the grounded key point of the rear wheel respectively along a line connecting the two grounded key points to form a length of the section; furthermore, the first sub-module can determine, as a height of the section, a vertical distance between 2D coordinates of the key point in a center of a vehicle handlebar and the line. For another example, in an application scenario where the target object is a two-wheeled motor vehicle and its rider or a two-wheeled non-motor vehicle and its rider, the first sub-module can determine a distance between a grounded key point of the front wheel and a grounded key point of the rear wheel according to 2D coordinates of the grounded key point of the front wheel and 2D coordinates of the grounded key point of the rear wheel, and extend outwards from the grounded key point of the front wheel and the grounded key point of the rear wheel respectively along a line connecting the two grounded key points to form a length of the section; furthermore, the first sub-module can determine, as a height of the section, a vertical distance between 2D coordinates of the key point on a top of the vehicle rider's head and the line. The second sub-module is configured to extend, with each vertex of the section as a starting point, the section in two directions perpendicular to the section respectively by a half of a thickness of the target object to form the pseudo 3D detection body of the target object in the 2D space. According to some embodiments, the thickness of the target object can be one of: a preset thickness, a distance between two ends of the vehicle handlebar, which is determined according to 2D coordinates of the key points on the two ends of the vehicle handlebar, or a distance between two shoulders of the rider, which is determined according to 2D coordinates of the key points on the shoulders of the rider.

In one or more embodiments, the constructing module 1410 can also include: a third sub-module and a fourth module. The third sub-module is configured to determine at least one structural plane of the target object according to predetermined belonging relationships between the at least one predetermined key point and planes included by the target object. The fourth sub-module is configured to construct the pseudo 3D detection body of the target object in the 2D space according to the structural plane and the 2D coordinates of the at least one predetermined key point.

For example, in the case that the target object is a motor vehicle with more than two wheels or a non-motor vehicle with more than two wheels, the constructing module 1410 can construct the pseudo 3D detection body of the target object using at least two of the following key points: a key point in a front left corner of the vehicle, a key point in a front left corner on a roof of the vehicle, a key point in a rear left corner on the roof of the vehicle, a key point in a rear left corner of the vehicle, a key point at a bottom of a rear left wheel, a key point at a bottom of a front left wheel, a key point in a front right corner of the vehicle, a key point in a front right corner on the roof of the vehicle, a key point in a rear right corner on the roof of the vehicle, a key point in a rear right corner of the vehicle, a key point at a bottom of a rear right wheel, a key point at a bottom of a front right wheel, a key point on a door of the vehicle, a key point on a rear-view mirror, a key point on a number plate of the vehicle, or a key point of a light of the vehicle.

In one or more embodiments, the third sub-module in the present disclosure can determine a basic plane and determine it as a structural plane of the target object. For example, the third sub-module can determine a plane including a greatest number of predetermined key points as the basic plane according to the predetermined belonging relationships between the at least one predetermined key point and the planes included by the target object. In this situation, the fourth sub-module can determine a normal vector of the basic plane, and form the pseudo 3D detection body according to an extension of vertices of the basic plane along a direction of the normal vector, For example, the fourth sub-module can determine a perpendicular line as the normal vector of the basic plane, the perpendicular line being from, a predetermined key point with a highest credibility among the predetermined key points not belonging to the basic plane, to the basic plane. For another example, the fourth sub-module can determine, as the normal vector of the basic plane, a difference between coordinates of two predetermined key points on an edge that is in a plane adjacent to the basic plane and is perpendicular to the basic plane.

In one or more embodiments, the third sub-module in the present disclosure can determine a basic plane and a quasi-basic plane and determine the two planes as the structural plane of the target object. For example, according to the predetermined belonging relationships between the at least one predetermined key point and the planes included by the target object, the third sub-module can determine a plane including a greatest number of predetermined key points as the basic plane, and determine, as the quasi-basic plane, a plane that is adjacent to the basic plane and includes a greatest number of predetermined key points not belonging to the basic plane. In this situation, the fourth sub-module can determine, as a normal vector of the basic plane, a perpendicular line from the predetermined key point in the quasi-basic plane to the basic plane and form the pseudo 3D detection body according to an extension of vertices of the basic plane along a direction of the normal vector.

The relevant description of the above operation S110 can be referred to for detailed operations performed by the constructing module 1410 and its sub-module.

The depth information acquisition module 1420 is configured to obtain the depth information of the multiple vertices of the pseudo 3D detection body.

In one or more embodiments, the depth information acquisition module 1420 in the present disclosure can include: a first distance sub-module and a first depth sub-module. The first distance sub-module is configured to obtain, according to 2D coordinates of two end points of a vertical edge of the pseudo 3D detection body in the image to be processed and a preset height value of the target object, a distance represented by a unit pixel at a position of a point on a ray corresponding to the vertical edge in a bird's eye view. Herein an origin of the ray is at a position of an image capturing device, which captures the image to be processed, in the bird's eye view. The first depth sub-module is configured to determine the depth information of the two end points of the vertical edge according to the distance and a parameter of the image capturing device. For example, the first depth sub-module can determine, as a horizontal coordinate of each end point in a 3D coordinate system, a product of a respective distance and a difference between a horizontal coordinate of the 2D coordinates of the endpoint and a shift amount of an optical center; and determine, as a coordinate in a depth direction of the end point in the 3D coordinate system, a ratio of a product of a focal length of the image capturing device and the horizontal coordinate of the end point in the 3D coordinate system, to the difference between the horizontal coordinate of the 2D coordinates of the end point and the shift amount of the optical center (FIG. 2 can be referred to for the example).

In one or more embodiments, the depth information acquisition module 1420 can include a second distance sub-module and a second depth sub-module. The second distance sub-module is configured to obtain, according to 2D coordinates of two end points of a horizontal edge of the pseudo 3D detection body in the image to be processed and a preset width value of the target object, a distance represented by a unit pixel on a projection line corresponding to the horizontal edge in a left or right view. The second depth sub-module is configured to determine the depth information of the two end points of the horizontal edge according to the distance and a parameter of the image capturing device. For example, the second depth sub-module determines, as a horizontal coordinate of each end point in a 3D coordinate system, a product of a respective distance and a difference between a horizontal coordinate of the 2D coordinates of the endpoint and a shift amount of an optical center; and determine, as a coordinate in a depth direction of the end point in the 3D coordinate system, a ratio of a product of a focal length of the image capturing device and the horizontal coordinate of the end point in the 3D coordinate system, to the difference between the horizontal coordinate of the 2D coordinates of the end point and the shift amount of the optical center (FIG. 4 can be referred to for the example).

The 3D detection body determination module 1430 is configured to determine a 3D detection body of the target object in a 3D space according to the depth information of the multiple vertices of the pseudo 3D detection body.

In one or more embodiments, the 3D detection body determination module 1430 can determine 3D coordinates of at least four vertices of the pseudo 3D detection body according to 2D coordinates and depth information of the at least four vertices; and the module can determine, in the case that the pseudo 3D detection body has further vertices other than the at least four vertices, 3D coordinates of the further vertices according to a positional relationship between edges of the pseudo 3D detection body. According to some embodiments, the above at least four vertices includes: end points of at least one vertical edge nearest to an image capturing device that captures the image to be processed. The relevant description of the above operation S110 can be referred to for detailed operations performed by the 3D detection body determination module 1430.

The first correcting module 1440 is configured to adjust the 3D detection body in the 3D space according to the pseudo 3D detection body in a 2D plane, to increase an overlap area between a graphic projection region of the adjusted 3D detection body projected on the 2D plane and the pseudo 3D detection body.

The second correcting module 1450 is configured to adjust the 3D detection body according to a preset length-to-width-to-height ratio of the target object.

The third correcting module 1460 is configured to adjust the 3D detection body according to a 2D target detection frame of the target object in the image to be processed, so that the graphic projection region of the adjusted 3D body projected on the 2D plane is included in the 2D target detection frame.

The executing and controlling module 1470 is configured to perform an operation of obtaining 2D detection of the target object, rather than performing 3D detection processing on the target object in response to that the at least one predetermined key point of the target object is not obtained. The executing and controlling module 1470 can also be configured to implement 3D detection of the target object according to point cloud data obtained based on a radar range device, in response to that the key points of the target object are not obtained.

The smoothing processing module 1480 is configured to perform smoothing processing on the 3D detection bodies in the 3D space of a same target object in a plurality of images to be processed that are temporally correlated. For example, operations of the smoothing processing performed by the smoothing processing module 1480 can include at least one of: smoothing processing on a length, a width and a height of the 3D detection body, smoothing processing on a motion direction of the 3D detection body, smoothing processing on a central point of a bird's eye view of the 3D detection body or smoothing processing on vertices of the 3D detection body.

The target object information determination module 1490 is configured to determine information of the target object according to the 3D detection body of the target object in the 3D space. For example, the information of the target object determined by the target object information determination module 1490 can include at least one of: information of a direction that the target object faces, spatial size information of the target object, information of a lane where the target object is on, predictive information of a motion of the target object, information of a distance between the target object and an image capturing device that captures the image to be processed, or information of an orientation between the target object and the image capturing device that captures the image to be processed.

Figure 15:
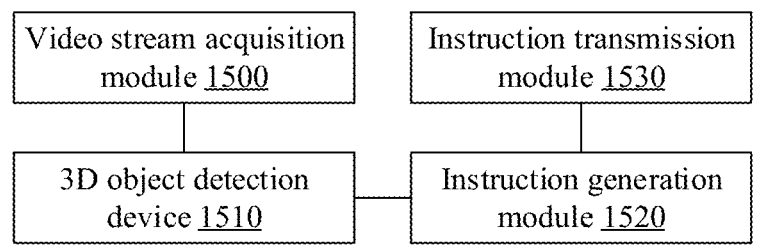
FIG. 15 is a schematic structural diagram illustrating an implementation of a device for controlling smart driving according to the present disclosure.

FIG. 15 is a schematic structural diagram illustrating an embodiment of a device for controlling smart driving according to the present disclosure. As illustrated in FIG. 15, the device includes: a video stream acquisition module 1500, a 3D object detection device 1510, an instruction generation module 1520 and an instruction transmission module 1530.

The video stream acquisition module 1500 is configured to obtain, by an image capturing device provided on a vehicle, a video stream of a road where the vehicle is on.

The 3D object detection device 1510 is configured to perform 3D target object detection on at least one frame of image included in the video stream, to obtain a 3D detection body of a target object in a 3D space. Description of FIG. 14 in the above device embodiment can be referred to for a detailed structure of the 3D object detection device 1510 and operations performed by each of models included in the 3D object detection device 1510.

The instruction generation module 1520 is configured to generate a control instruction for the vehicle according to the 3D detection body.

In one or more embodiments, the instruction generation module 1520 can first determine the information of the target object according to the 3D detection body of the target object. If the instruction generation module 1520 determines at least one of: information of a direction that the target object faces (such as a direction that a front end of a vehicle faces), spatial size information of the target object (such as a 3D size of the target object in the real world), information of a lane where the target object is on (for example, the target object is on its left or right lane), predictive information of a motion of the target object (for example, the target object is accelerating), information of a distance between the target object and an image capturing device that captures the image to be processed (such as a straight distance between the target object and the image capturing device), or information of an orientation between the target object and the image capturing device that captures the image to be processed (such as angle between the target object and the Z-axis of the image capturing device). Then, the instruction generation module 1520 generates the control instruction for the vehicle according to the information of the target object. The instruction generated by the instruction generation module 1520 includes but is not limited to: a control instruction for maintaining a speed, a control instruction for adjusting the speed (such as a decelerating driving instruction and an accelerating driving instruction), a control instruction for maintaining a direction, a control instruction for adjusting the direction (such as an instruction for turning left, an instruction for turning right, an instruction for moving to a left lane and an instruction for moving to a right lane), a honking instruction, a control instruction for an alert reminder or a control instruction for switching a driving mode (for example, a switch is made to an automatic cruise driving mode).

The instruction transmission module 1530 is configured to transmit the control instruction to the vehicle.

It should be particularly noted that besides a field of smart driving control, the 3D object detection method and the 3D object detection device in the present disclosure can also be applied to other fields which include but are not limited to, for example, a field of industrial manufacturing, an indoor monitoring field such as a supermarket-monitoring field, a security field and the like.

Figure 16:
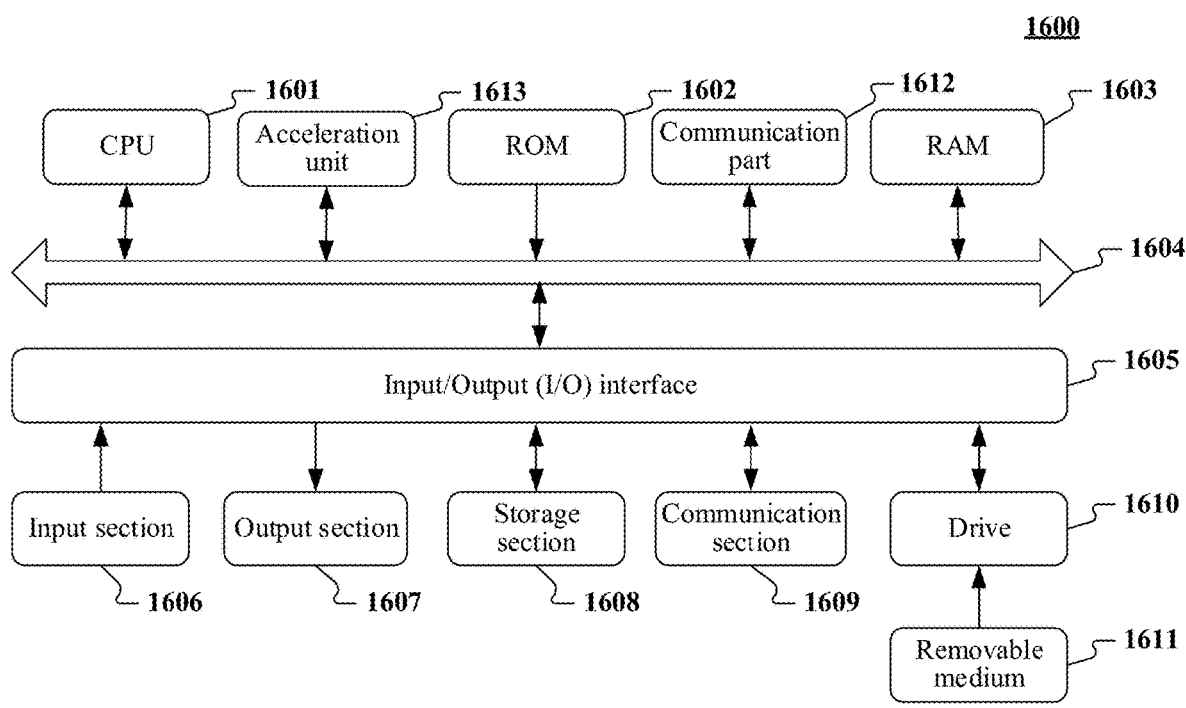
FIG. 16 is a block diagram of an exemplary device for implementing an implementation of the present disclosure.

FIG. 16 illustrates an exemplary device 1600 suitable for implementing the present disclosure. The device 1600 may be a control system/an electronic system configured in a vehicle, a mobile terminal (for example, a smart mobile phone or the like), a Personal Computer (PC) (for example, a desktop computer or a notebook computer or the like),a tablet computer, a server or the like. In FIG. 16, the device 1600 includes one or more processors, a communication part, and the like. The one or more processors are one or more Central Processing Units (CPUs) 1601 and/or one or more acceleration unit 1613 which may include but is not limited to a Graphic Processing Units (GPU), a Field Programmable Gate Array (FPGA) or the like, and the processors may perform various appropriate actions and processing according to executable instructions stored in a Read-Only Memory (ROM) 1602 or executable instructions loaded from a storage section 1608 to a Random Access Memory (RAM) 1603. The communication part 1612 may include, but is not be limited to, a network card. The network card may include, but is not be limited to, an Infiniband (IB) network card. The processor may communicate with the ROM 1602 and/or the RAM 1603, to execute executable instructions. The processor is connected to the communication part 1604 via a bus 1612, and communicates with other target devices via the communication part 1612, thereby implementing corresponding operations in the present disclosure. Reference may be made to related descriptions of the above method embodiments for the operations performed by each of the above instructions, which will not be elaborated herein. In addition, the RAM 1603 further may store various programs and data required for operations of an apparatus. The CPU 1601, the ROM 1602, and the RAM 1603 are connected to each other via the bus 1604.

In the presence of the RAM 1603, the ROM 1602 is an optional module. The RAM 1603 stores executable instructions, or writes the executable instructions into the ROM 1602 during running, where the executable instructions cause the CPU 1601 to execute operations included in the three-dimensional object detection method or the method for controlling smart driving. An input/output (I/O) interface 1605 is also connected to the bus 1604. The communication part 1612 may be configured integrally, and may also be configured to have multiple sub-modules (for example, multiple IB network cards) respectively connected to the bus. The following components are connected to the I/O interface 1605: an input section 1606 including a keyboard, a mouse, and the like; an output section 1607 including a Cathode-Ray Tube (CRT), a Liquid Crystal Display (LCD), a speaker, and the like; a storage section 1608 including a hard disk and the like; and a communication section 1609 of a network interface card including an LAN card, a modem, and the like. The communication section 1609 performs communication processing via a network such as the Internet. A drive 1610 is also connected to the I/O interface 1605 according to requirements. A removable medium 1611 such as a magnetic disk, an optical disk, a magneto-optical disk, a semiconductor memory is installed on the drive 1610 according to requirements, so that a computer program read from the removable medium is installed on the storage section 1608 according to requirements.

It should be particularly noted that, the architecture illustrated in FIG. 16 is merely an optional implementation. During specific practice, the number and types of the components in FIG. 16 may be selected, decreased, increased, or replaced according to actual requirements. Different functional components may be configured respectively or integrally or the like. For example, the GPU 1613 and the CPU 1601 may be configured respectively. For another example, the GPU 1613 may be integrated on the CPU 1601, and the communication part may be configured respectively, and may also be configured integrally on the CPU 1601 or the GPU 1613 or the like. These alternative implementations all fall within the scope of protection of the present disclosure.

Particularly, according to the implementations of the present disclosure, the process described below with reference to a flowchart may be implemented as a computer software program. For example, the implementations of the present disclosure include a computer program product, which includes a computer program tangibly included in a machine-readable medium. The computer program includes a program code for performing operations shown in the flowchart. The program code may include instructions for correspondingly performing operations in the method provided by the disclosure.

In such implementations, the computer program may be downloaded and installed from the network through the communication section 1609, and/or may be installed from the removable medium 1611. The computer program, when being executed by the CPU 1601, executes the foregoing instructions of corresponding operations described in the present disclosure.

In one or more embodiments, a computer program product is also provided in the embodiments of the disclosure and is used to store the computer readable instructions. When the instructions are executed, the 3D object detection method or the method for controlling smart driving in any of the above embodiments according are caused to be performed by the computer.

The computer program product may be implemented using software, hardware, or a combination of the software and the hardware. In one or more embodiments, the computer program product is specifically embodied as a software product such as a Software Development Kit (SDK).

In one or more embodiments, another 3D object detection method, the method for controlling smart driving, the corresponding device, electronic apparatuses, computer storage medium, computer program and computer program product are provided in the embodiments of the disclosure. The method can include following operations: a first device transmits a 3D object detection instruction or an instruction for controlling smart driving to a second device, herein the instruction enables the second device to perform the 3D object detection method or the method for controlling smart driving in any of above possible embodiments; and the first device receives a result of the 3D object detection or a result of controlling smart driving from the second device.

In some embodiments, the 3D object detection instruction or the instruction for controlling smart driving can be a specific invocation instruction. The first device can instruct the second device to perform an 3D object detection operation or an operation for controlling smart driving in a manner of invocation. Accordingly, in response to reception of the invocation instruction, the second device can perform operations and/or processes in any embodiment in the above 3D object detection method or the method for controlling smart driving.

It should be understood that the term such as "first" and "second" are merely used for the sake of differentiation and is not intended to limit the embodiments of the disclosure. It should also be understood that "a plurality of" in the disclosure may mean "two or more" and "at least one" may mean "one, two or more." It should also be understood that the number of parts, data or structures mentioned in the disclosure is equal to or greater than one unless definite limitation is imposed, or opposite enlightenment is given in the context. It should also be understood that description of each embodiment puts emphasis on differences among the embodiments while same things or similarities shared by the embodiments can be referred to and will not be elaborated for the sake of brevity.

The methods, the devices, the electronic apparatuses and the computer readable medium in the disclosure may be implemented in many manners. For example, the methods, the devices, the electronic apparatuses and the computer readable mediums in the disclosure may be implemented with software, hardware, firmware, or any combination of software, hardware, and firmware. The foregoing sequence of the operations of the method is merely for description, and unless otherwise stated particularly, is not intended to limit the operations of the method in the disclosure. Furthermore, in some embodiments, the disclosure is also implemented as programs recorded in a recording medium. The programs include machine-readable instructions for implementing the methods according to the disclosure. Therefore, the present disclosure further covers the recording medium storing the programs for performing the methods according to the disclosure.

The descriptions of the disclosure are provided for the purpose of examples and description, and are not intended to be exhaustive or limit the disclosure to the disclosed form. Many modifications and changes are obvious to a person of ordinary skill in the art. The implementations are selected and described to better describe a principle and an actual application of the disclosure, and to make a person of ordinary skill in the art understand the embodiments of the disclosure, so as to design various implementations with various modifications applicable to particular use.

The invention claimed is:

1. A three-dimensional (3D) object detection method, comprising:
obtaining two-dimensional (2D) coordinates of at least one predetermined key point of a target object in an image to be processed;
constructing a pseudo 3D detection body of the target object in a 2D space according to the 2D coordinates of the at least one predetermined key point;
obtaining depth information of a plurality of vertices of the pseudo 3D detection body; and
determining a 3D detection body of the target object in a 3D space according to the depth information of the plurality of vertices of the pseudo 3D detection body,
wherein the obtaining 2D coordinate of at least one predetermined key point of the target object in an image to be processed comprises:
performing target object detection on the image to be processed to obtain a 2D target detection frame comprising at least part of the target object;
performing key point detection on an image part of the image to be processed corresponding to the 2D target detection frame; and
determining, as the at least one predetermined key point of the target object, one or more key points with a credibility greater than a preset credibility threshold among resulting key points obtained through the key point detection performed on the target object.

2. The method according to claim 1, wherein the constructing a pseudo 3D detection body of the target object in a 2D space according to the 2D coordinates of the at least one predetermined key point comprises:
determining a lengthwise section of the target object according to the 2D coordinates of the at least one predetermined key point, wherein a length of the target object corresponds to a length of the pseudo 3D detection body; and
extending, with each vertex of the section as a starting point, the section in two directions perpendicular to the section respectively by a half of a thickness of the target object, to form the pseudo 3D detection body of the target object in the 2D space.

3. The method according to claim 2, wherein the target object comprises: a two-wheeled motor vehicle, a two-wheeled non-motor vehicle, a two-wheeled motor vehicle and its rider, or a two-wheeled non-motor vehicle and its rider; and the at least one predetermined key point comprises at least one of: a key point in a center of a front wheel, a key point in a center of a rear wheel, a key point on a front end of the front wheel, a key point on a rear end of the rear wheel, a grounded key point of the front wheel, a grounded key point of the rear wheel, a key point on a support of a vehicle seat, a key point on a pedal bearing, a key point in a center of a vehicle handlebar, key points on two ends of the vehicle handlebar, a key point on top of the rider's head, or two key points on shoulders of the rider,
wherein the determining a lengthwise section of the target object according to the 2D coordinates of the at least one predetermined key point comprises:
determining a distance between the grounded key point of the front wheel and the grounded key point of the rear wheel according to 2D coordinates of the grounded key point of the front wheel and 2D coordinates of the grounded key point of the rear wheel;
extending outwards from the grounded key point of the front wheel and the grounded key point of the rear wheel respectively along a line connecting the two grounded key points to form a length of the section;
determining, as a height of the section, a vertical distance between 2D coordinates of the key point in the center of the vehicle handlebar and the line or a vertical distance between 2D coordinates of the key point on the top of the vehicle rider's head and the line.

4. The method according to claim 3, wherein the thickness of the target object is one of:
a preset thickness;
a distance between the two ends of the vehicle handlebar, which is determined according to 2D coordinates of the key points on the two ends of the vehicle handlebar; or
a distance between the two shoulders of the rider, which is determined according to 2D coordinates of the two key points on the shoulders of the rider.

5. The method according to claim 1, wherein the constructing a pseudo 3D detection body of the target object in a 2D space according to the 2D coordinates of the at least one predetermined key point comprises:
determining at least one structural plane of the target object according to predetermined belonging relationships between the at least one predetermined key point and planes included by the target object; and
constructing the pseudo 3D detection body of the target object in the 2D space according to the structural plane and the 2D coordinates of the at least one predetermined key point,
wherein the target object comprises a motor vehicle with more than two wheels or a non-motor vehicle with more than two wheels, wherein the predetermined key points for constructing the pseudo 3D detection body of the target object comprises at least two of: a key point in a front left corner of the vehicle, a key point in a front left corner on a roof of the vehicle, a key point in a rear left corner on the roof of the vehicle, a key point in a rear left corner of the vehicle, a key point at a bottom of a rear left wheel, a key point at a bottom of a front left wheel, a key point in a front right corner of the vehicle, a key point in a front right corner on the roof of the vehicle, a key point in a rear right corner on the roof of the vehicle, a key point in a rear right corner of the vehicle, a key point at a bottom of a rear right wheel, a key point at a bottom of a front right wheel, a key point on a door of the vehicle, a key point on a rear-view mirror, a key point on a number plate of the vehicle, or a key point of a light of the vehicle.

6. The method according to claim 5, wherein the at least one structural plane comprises a basic plane,
wherein the determining at least one structural plane of the target object according to predetermined belonging relationships between the at least one predetermined key point and planes included by the target object comprises:
determining a plane comprising a greatest number of predetermined key points as the basic plane according to the predetermined belonging relationships between the at least one predetermined key point and the planes included by the target object; and
wherein the constructing the pseudo 3D detection body of the target object in the 2D space according to the structural plane and the 2D coordinates of the at least one predetermined key point comprises:
determining a normal vector of the basic plane; and
forming the pseudo 3D detection body according to an extension of vertices of the basic plane along a direction of the normal vector, wherein the determining a normal vector of the basic plane comprises:
  determining a perpendicular line as the normal vector of the basic plane, the perpendicular line being from, a predetermined key point with a highest credibility among the predetermined key points not belonging to the basic plane, to the basic plane; or
  determining, as the normal vector of the basic plane, a difference between coordinates of two predetermined key points on an edge that is in a plane adjacent to the basic plane and is perpendicular to the basic plane.

7. The method according to claim 5, wherein the at least one structural plane comprises a basic plane and a quasi-basic plane,
  wherein the determining at least one structural plane of the target object according to predetermined belonging relationships between the at least one predetermined key point and planes included by the target object comprises:
  according to the predetermined belonging relationships between the at least one predetermined key point and the planes included by the target object, determining a plane comprising a greatest number of predetermined key points as the basic plane, and determining, as the quasi-basic plane, a plane that is adjacent to the basic plane and comprises a greatest number of predetermined key points not belonging to the basic plane; and
  wherein the constructing the pseudo 3D detection body of the target object in the 2D space according to the structural plane and the 2D coordinates of the at least one predetermined key point comprises:
  determining, as a normal vector of the basic plane, a perpendicular line from the predetermined key point in the quasi-basic plane to the basic plane; and
  forming the pseudo 3D detection body according to an extension of vertices of the basic plane along a direction of the normal vector.

8. The method according to claim 1, wherein:
  the target object comprises a two-wheeled motor vehicle and its rider, wherein the performing target object detection on the image to be processed to obtain a 2D target detection frame comprising at least part of the target object comprises: performing the target object detection on the image to be processed to obtain the 2D target detection frame comprising the two-wheeled motor vehicle or comprising the two-wheeled motor vehicle and its rider; or
  the target object comprises a two-wheeled non-motor vehicle and its rider, wherein the performing target object detection on the image to be processed to obtain a 2D target detection frame comprising at least part of the target object comprises: performing the target object detection on the image to be processed to obtain the 2D target detection frame comprising the two-wheeled non-motor vehicle or comprising the two-wheeled non-motor vehicle and its rider.

9. The method according to claim 1, wherein the obtaining depth information of a plurality of vertices of the pseudo 3D detection body comprises:
  obtaining, according to 2D coordinates of two end points of a vertical edge of the pseudo 3D detection body in the image to be processed and a preset height value of the target object, a distance represented by a unit pixel at a position of a point on a ray corresponding to the vertical edge in a bird's eye view, wherein an origin of the ray is at a position of an image capturing device, which captures the image to be processed, in the bird's eye view; and
  determining the depth information of the two end points of the vertical edge according to the distance and a parameter of the image capturing device.

10. The method according to claim 9, wherein the determining the depth information of the two end points of the vertical edge according to the distance and a parameter of the image capturing device or the determining the depth information of the two end points of the horizontal edge according to the distance and a parameter of the image capturing device comprises:
  determining, as a horizontal coordinate of each end point in a 3D coordinate system, a product of a respective distance and a difference between a horizontal coordinate of the 2D coordinates of the end point and a shift amount of an optical center; and
  determining, as a coordinate in a depth direction of the end point in the 3D coordinate system, a ratio of a product of a focal length of the image capturing device and the horizontal coordinate of the end point in the 3D coordinate system, to the difference between the horizontal coordinate of the 2D coordinates of the end point and the shift amount of the optical center.

11. The method according to claim 1, wherein the obtaining depth information of a plurality of vertices of the pseudo 3D detection body comprises:
  obtaining, according to 2D coordinates of two end points of a horizontal edge of the pseudo 3D detection body in the image to be processed and a preset width value of the target object, a distance represented by a unit pixel on a projection line corresponding to the horizontal edge in a left or right view; and
  determining the depth information of the two end points of the horizontal edge according to the distance and a parameter of the image capturing device.

12. The method according to claim 1, wherein the determining a 3D detection body of the target object in a 3D space according to the depth information of the plurality of vertices of the pseudo 3D detection body comprises:
  determining 3D coordinates of at least four vertices of the pseudo 3D detection body according to 2D coordinates and depth information of the at least four vertices; and
  in the case that the pseudo 3D detection body has further vertices other than the at least four vertices, determining 3D coordinates of the further vertices according to a positional relationship between edges of the pseudo 3D detection body.

13. The method according to claim 12, wherein the at least four vertices comprise: end points of at least one vertical edge nearest to an image capturing device that captures the image to be processed.

14. The method according to claim 1, further comprising, after determining the 3D detection body of the target object in the 3D space, at least one of:
  adjusting the 3D detection body in the 3D space according to the pseudo 3D detection body in a 2D plane, to increase an overlap area between a graphic projection region of the adjusted 3D detection body projected on the 2D plane and the pseudo 3D detection body;
  adjusting the 3D detection body according to a preset length-to-width-to-height ratio of the target object; or
  adjusting the 3D detection body according to a 2D target detection frame of the target object in the image to be processed, so that the graphic projection region of the adjusted 3D body projected on the 2D plane is included in the 2D target detection frame.

15. The method according to claim 1, further comprising:
in response to that the at least one predetermined key point of the target object is not obtained, performing an operation of obtaining 2D detection of the target object, rather than performing 3D detection processing on the target object;
in response to that the key points of the target object are not obtained, implementing 3D detection of the target object according to point cloud data obtained based on a radar range device.

16. The method according to claim 1, further comprising, after determining the 3D detection body of the target object in the 3D space:
performing smoothing processing on the 3D detection bodies in the 3D space of a same target object in a plurality of images to be processed that are temporally correlated,
wherein the smoothing processing comprises at least one of: smoothing processing on a length, a width and a height of the 3D detection body, smoothing processing on a motion direction of the 3D detection body, smoothing processing on a central point of a bird's eye view of the 3D detection body or smoothing processing on vertices of the 3D detection body.

17. The method according to claim 1, further comprising, after determining the 3D detection body of the target object in the 3D space:
determining information of the target object according to the 3D detection body of the target object in the 3D space, wherein the information of the target object comprises at least one of:
information of a direction that the target object faces, spatial size information of the target object, information of a lane where the target object is on, predictive information of a motion of the target object, information of a distance between the target object and an image capturing device that captures the image to be processed, or information of an orientation between the target object and the image capturing device that captures the image to be processed.

18. A method according to claim 1, further comprising:
obtaining, by an image capturing device provided on a vehicle, a video stream of a road where the vehicle is on;
performing three-dimensional (3D) target object detection on at least one frame of image included in the video stream according to the method of claim 1, to obtain a 3D detection body of a target object in a 3D space;

generating a control instruction for the vehicle according to the 3D detection body; and
transmitting the control instruction to the vehicle.

19. An electronic apparatus comprising:
memory storing processor-executable instructions; and
a processor arranged to execute the stored processor-executable instructions to perform operations of:
obtaining two-dimensional (2D) coordinates of at least one predetermined key point of a target object in an image to be processed;
constructing a pseudo 3D detection body of the target object in a 2D space according to the 2D coordinates of the at least one predetermined key point;
obtaining depth information of a plurality of vertices of the pseudo 3D detection body; and
determining a three-dimensional (3D) detection body of the target object in a 3D space according to the depth information of the plurality of vertices of the pseudo 3D detection body,
wherein the obtaining 2D coordinate of at least one predetermined key point of the target object in an image to be processed comprises:
performing target object detection on the image to be processed to obtain a 2D target detection frame comprising at least part of the target object;
performing key point detection on an image part of the image to be processed corresponding to the 2D target detection frame; and
determining, as the at least one predetermined key point of the target object, one or more key points with a credibility greater than a preset credibility threshold among resulting key points obtained through the key point detection performed on the target object.

20. The electronic apparatus according to claim 19, wherein the constructing a pseudo 3D detection body of the target object in a 2D space according to the 2D coordinates of the at least one predetermined key point comprises:
determining a lengthwise section of the target object according to the 2D coordinates of the at least one predetermined key point, wherein a length of the target object corresponds to a length of the pseudo 3D detection body; and
extending, with each vertex of the section as a starting point, the section in two directions perpendicular to the section respectively by a half of a thickness of the target object, to form the pseudo 3D detection body of the target object in the 2D space.

* * * * *